United States Patent
Menon et al.

(10) Patent No.: US 10,032,320 B1
(45) Date of Patent: *Jul. 24, 2018

(54) SYSTEM AND METHOD FOR DETERMINING DRIVING PATTERNS USING TELEMATICS DATA

(71) Applicant: STATE FARM MUTUAL AUTOMOBILE INSURANCE COMPANY, Bloomington, IL (US)

(72) Inventors: Sunish Shreenarayan Menon, Normal, IL (US); David J. Dosher, Fitchburg, WI (US); Scott Thomas Christensen, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,272

(22) Filed: Aug. 7, 2017

Related U.S. Application Data

(63) Continuation of application No. 14/277,939, filed on May 15, 2014, now Pat. No. 9,786,103.

(51) Int. Cl.
- *G06Q 40/08* (2012.01)
- *G07C 5/00* (2006.01)
- *G07C 5/08* (2006.01)

(52) U.S. Cl.
CPC ............ *G07C 5/008* (2013.01); *G06Q 40/08* (2013.01); *G07C 5/085* (2013.01); *G07C 5/0825* (2013.01)

(58) Field of Classification Search
CPC .................................. G07C 5/08; G06Q 40/08
(Continued)

(56) References Cited

U.S. PATENT DOCUMENTS

| | | |
|---|---|---|
| 5,499,182 A | 3/1996 | Ousborne |
| 5,819,206 A | 10/1998 | Horton et al. |

(Continued)

FOREIGN PATENT DOCUMENTS

| | | |
|---|---|---|
| EP | 2452156 A1 | 5/2012 |
| WO | WO-2004/040405 A2 | 5/2004 |

(Continued)

*Primary Examiner* — Jason Borlinghaus
*Assistant Examiner* — Ambreen A. Alladin
(74) *Attorney, Agent, or Firm* — Marshall, Gerstein & Borun LLP; Randall G. Rueth

(57) ABSTRACT

A computer implemented method for determining a driving pattern from raw telematics data is presented. A data server may receive, via a computer network, a plurality of telematics data corresponding to a trip of a vehicle, wherein the plurality of telematics data originates from a client computing device. The data server may also identify a first primary movement window of the vehicle trip and one or more constant speed and idling windows of the vehicle trip. The data server may further estimate gravity from the telematics data in the first primary movement window of the vehicle trip and generate a pitch and a roll angle from the first primary movement window of the vehicle trip, as well as one or more yaw angle estimates from the first primary movement window of the vehicle trip. The data server may further determine a driving pattern using at least constant speed times, idling times, acceleration, breaking, vehicle turns and relate that to estimate driving risk and insurance premium.

17 Claims, 22 Drawing Sheets

US 10,032,320 B1
Page 2

(58) Field of Classification Search
USPC .................................................... 705/37, 44
See application file for complete search history.

(56) References Cited

U.S. PATENT DOCUMENTS

| | | | |
|---|---|---|---|
| 6,832,141 B2 | 12/2004 | Skeen et al. | |
| 7,136,751 B2 | 11/2006 | Pinto et al. | |
| 8,200,374 B2 | 6/2012 | Tan et al. | |
| 8,416,067 B2 | 4/2013 | Davidson et al. | |
| 8,457,880 B1 | 6/2013 | Malalur et al. | |
| 8,928,495 B2 | 1/2015 | Hassib et al. | |
| 8,952,869 B1 | 2/2015 | Weaver et al. | |
| 9,086,948 B1 | 7/2015 | Slusar et al. | |
| 2004/0172173 A1 | 9/2004 | Goto et al. | |
| 2005/0096809 A1 | 5/2005 | Skeen et al. | |
| 2005/0186941 A1 | 8/2005 | Gault et al. | |
| 2006/0079203 A1 | 4/2006 | Nicolini | |
| 2008/0262670 A1 | 10/2008 | McClellan et al. | |
| 2010/0023183 A1 | 1/2010 | Huang et al. | |
| 2010/0131304 A1* | 5/2010 | Collopy | G06Q 30/0224 |
| | | | 705/4 |
| 2010/0211249 A1 | 8/2010 | McClellan | |
| 2010/0323657 A1 | 12/2010 | Barnard et al. | |
| 2011/0153367 A1 | 6/2011 | Amigo et al. | |
| 2011/0202225 A1* | 8/2011 | Willis | G01C 21/165 |
| | | | 701/31.4 |
| 2011/0307188 A1 | 12/2011 | Peng et al. | |
| 2012/0071151 A1 | 3/2012 | Abramson et al. | |
| 2012/0172055 A1 | 7/2012 | Edge | |
| 2012/0197669 A1* | 8/2012 | Kote | G06Q 10/10 |
| | | | 705/4 |
| 2012/0209490 A1 | 8/2012 | Lu et al. | |
| 2012/0310442 A1 | 12/2012 | Doutaz et al. | |
| 2013/0006674 A1* | 1/2013 | Bowne | G06Q 10/0639 |
| | | | 705/4 |
| 2013/0006675 A1 | 1/2013 | Bowne et al. | |
| 2013/0046510 A1 | 2/2013 | Bowne et al. | |
| 2013/0151288 A1 | 6/2013 | Bowne et al. | |
| 2013/0173207 A1 | 7/2013 | Tanenhaus | |
| 2013/0179198 A1 | 7/2013 | Bowne et al. | |
| 2013/0302758 A1 | 11/2013 | Wright | |
| 2013/0344862 A1 | 12/2013 | Alameh et al. | |
| 2014/0012477 A1 | 1/2014 | Lu et al. | |
| 2014/0058761 A1 | 2/2014 | Freiberger et al. | |
| 2014/0122016 A1 | 5/2014 | Friend | |
| 2014/0139655 A1 | 5/2014 | Mimar | |
| 2014/0149145 A1 | 5/2014 | Peng et al. | |
| 2014/0278206 A1* | 9/2014 | Girod | G01C 15/00 |
| | | | 702/141 |
| 2014/0358840 A1 | 12/2014 | Tadic et al. | |
| 2015/0051785 A1 | 2/2015 | Pal et al. | |
| 2015/0285835 A1 | 10/2015 | Karahan et al. | |
| 2015/0345952 A1 | 12/2015 | Chang et al. | |

FOREIGN PATENT DOCUMENTS

| | | |
|---|---|---|
| WO | WO-2011003461 A1 | 1/2011 |
| WO | WO-2012/080741 A1 | 6/2012 |

* cited by examiner

SYSTEM AND METHOD FOR DETERMINING DRIVING PATTERNS USING TELEMATICS DATA

RELATED APPLICATIONS

This application is a continuation of U.S. application Ser. No. 14/277,939, entitled "System and Method for Determining Driving Patterns Using Telematics Data", filed on May 15, 2014, the entire disclosure of which is hereby expressly incorporated by reference herein. This application is related to U.S. patent application Ser. No. 14/277,848, entitled "System And Method For Identifying Primary And Secondary Movement Using Spectral Domain Analysis" and concurrently filed, the entire disclosure of which is hereby expressly incorporated by reference herein. This application is also related to U.S. patent application Ser. No. 14/277,867, entitled "System And Method For Identifying Idling Times Of A Vehicle Using Accelerometer Data" and concurrently filed, the entire disclosure of which is hereby expressly incorporated by reference herein. This application is also related to U.S. patent application Ser. No. 14/277,882, entitled "System And Method For Identifying Heading Of A Moving Vehicle Using Accelerometer Data" and concurrently filed, the entire disclosure of which is hereby expressly incorporated by reference herein. This application is also related to U.S. patent application Ser. No. 14/277,924, entitled "System And Method For Separating Ambient Gravitational Acceleration From A Moving Three-Axis Accelerometer Data" and concurrently filed, the entire disclosure of which is hereby expressly incorporated by reference herein.

TECHNICAL FIELD

The present disclosure generally relates to a system and method for determining an orientation of a device and a driving pattern from telematics data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many companies employ vehicle monitoring systems for a variety of purposes, including determination of insurance risk and/or premiums. These systems may monitor many vehicle attributes, such as location, speed, acceleration/deceleration, etc. The monitoring devices are integrated with the vehicle or plugged into the vehicle systems. Many of these monitoring systems require expert installation into the vehicle and further require the user to periodically withdraw the monitoring device to download the trip data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer implemented method for determining an orientation of a device and a driving pattern from telematics data may include receiving, via a computer network, a plurality of telematics data corresponding to a trip of a vehicle, wherein the plurality of telematics data originates from a client computing device. The method may further include identifying, by one or more processors, a first primary movement window of the vehicle trip and one or more idling windows of the vehicle trip. Primary movement refers to vehicle movement when the telematics device is static with respect to the vehicle. The method may also include determining constant speed times including idling times. The method may also include minimizing, by the one or more processors, an effect of gravity on the telematics data in the first primary movement window of the vehicle trip and generating, by the one or more processors, a pitch and a roll angle from the first primary movement window of the vehicle trip. The method may also include generating, by the one or more processors, one or more yaw angle estimates from the first primary movement window of the vehicle trip. The method may further include, by one or more processors, summarizing the driving pattern using at least idling times, constant speed times, acceleration events, breaking events, right turns, left turns and information from other sensor data like GPS, gyroscope, magnetometer and relate this to an insurance account to estimate driving risk and future insurance premium.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
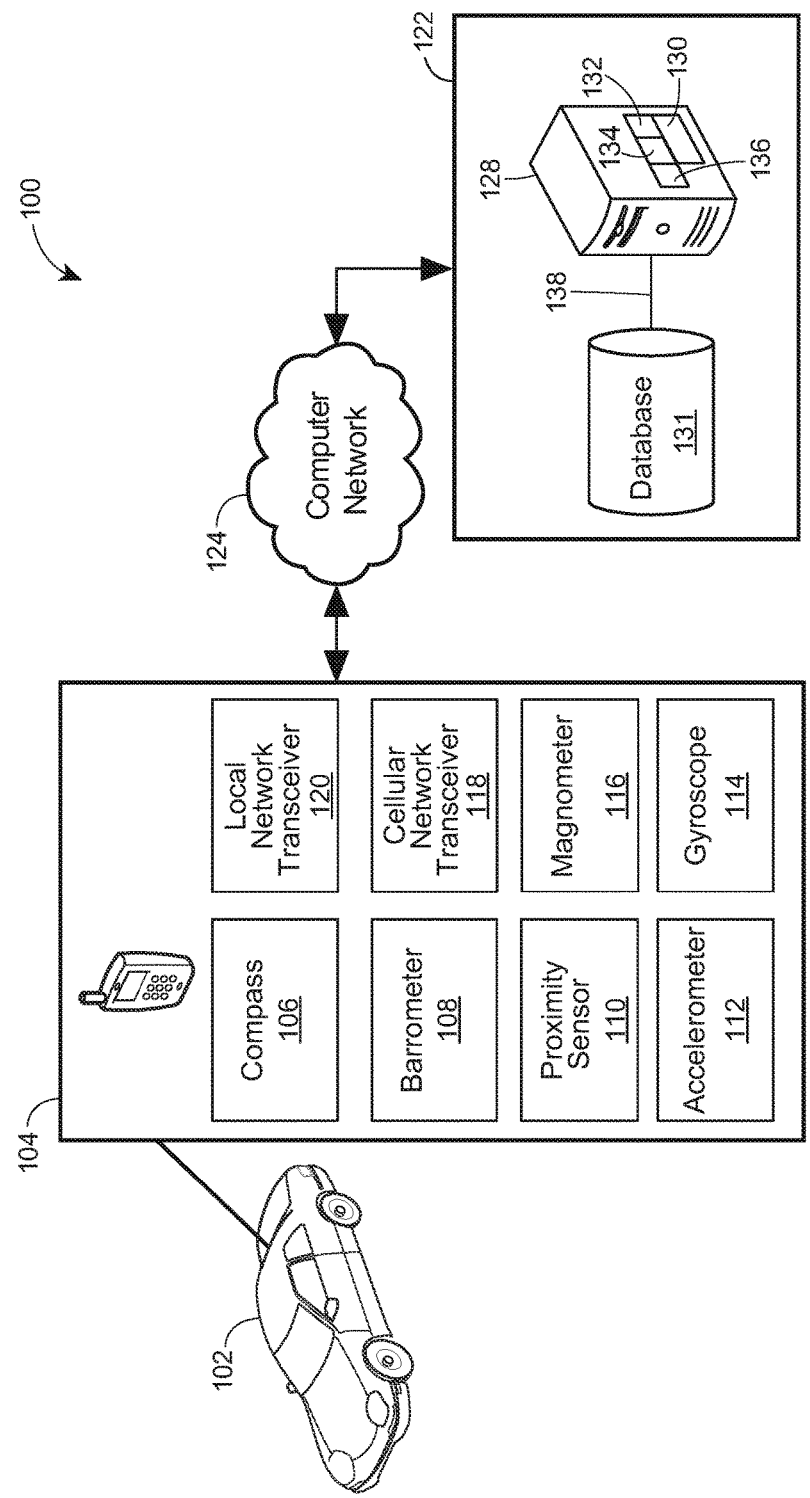
FIG. 1 is a simplified and exemplary block diagram of a system and method for orienting telematics data.

FIG. 1 illustrates various aspects of an exemplary architecture implementing a system for determining an orientation of a device from telematics data. The high-level architecture includes both hardware and software applications, as well as various data communications channels for communicating data between the various hardware and software components. The system for determining the orientation of a device from telematics data may include various software and hardware components or modules.

The system for determining the orientation of a device from telematics data may include front end components, including a client computing device 104. The client computing device 104 may be placed in a vehicle, such as a car 102. The client computing device 104 may include a personal computer, a smart phone, a tablet computer, a smart watch, a head mounted display, a wearable computer or other suitable client computing device. A processor of the client computing device 104 may execute instructions to collect data from one or more onboard sensors. For example, the sensors may include a compass 106, a barometer 108, a proximity sensor 110, an accelerometer 112, a gyroscope 114 and a magnometer 116. In some embodiments, the client computing device 104 may have some or all of these sensors. In some embodiments, the client computing device 104 may include additional sensors. The client computing device 104 may also include a cellular network transceiver 118 and/or a local network transceiver 120 for communicating with the backend components 122 via the computer network 124.

In some embodiments, a processor of the client computing device 104 executes instructions to manage, receive and transmit data collected by the sensors, and/or other data, such as an account identifier associated with a customer account or a client computing device identifier. The client computing device 104 may transmit data to, or otherwise communicate with, back end components 122 via the computer network 124. The computer network 124 may be a network such as the Internet or other type of suitable network (e.g., local area network (LAN), a metropolitan area network (MAN), a wide area network (WAN), a mobile, a wired or wireless network, a private network, a virtual private network, etc.). The computer network 124 may also be one or more cellular networks such as code division multiple access (CDMA) network, GSM (Global System for Mobile Communications) network, WiMAX (Worldwide Interoperability for Microwave Access) network, Long Term Evolution (LTE) network, etc. The processor of the client computing device 104 may also execute one or more applications to perform the tasks discussed above. The client computing device 104 may also execute one or more applications to allow a customer to manage a customer account, view driving statistics, change settings, etc.

The back end components 122 may include a data server 128 and an account database 131. The back end components may communicate with each other through a communication network 138 such as a local area network or other type of suitable network (e.g., the Internet, a metropolitan area network (MAN), a wide area network (WAN), a mobile, a wired or wireless network, a private network, a virtual private network, etc.).

In some embodiments, the system for determining the orientation of a device from telematics data in general and the data server 128 in particular may include computer-executable instructions 130. A processor of the data server 128 may execute the instructions 130 to instantiate an access tool 132, a retrieval tool 134 and an analysis tool 136. The access tool 132 may receive data from the client computing device 104 and save the data to one or more databases, such as the vehicle database 130. The retrieval tool 134 may retrieve data from the account database 131 or use an account identifier to access customer account information from the account database 131. The account database 131 may be a data storage device such as random-access memory (RAM), hard disk drive (HDD), flash memory, flash memory such as a solid state drive (SSD), etc. The analysis tool 136 may perform one or more analyses on the vehicle data and/or customer account data.

Figure 2:
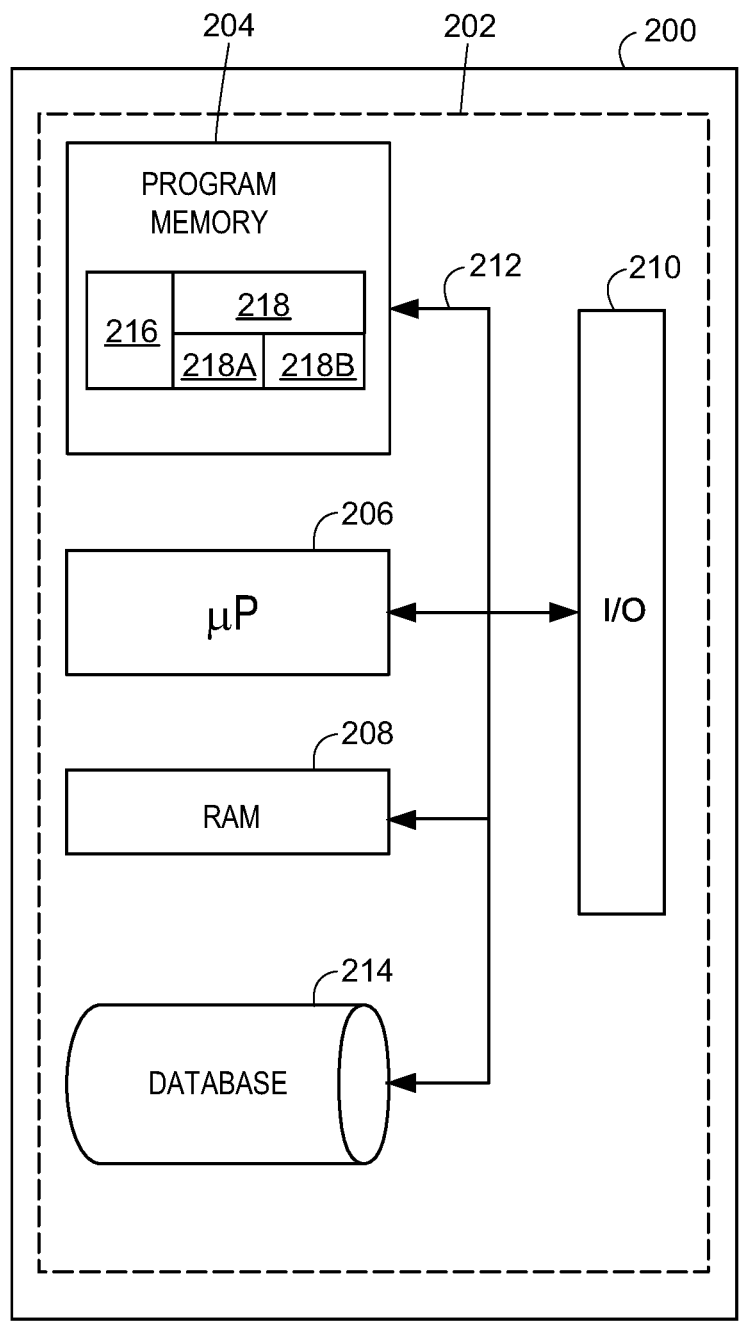
FIG. 2 is an exemplary architecture of a data system.

Referring now to FIG. 2, a data system 200 includes a controller 202. Exemplary data systems include the client computing device 104 and the data server 128 as illustrated in FIG. 1. The controller 202 includes a program memory 204, a microcontroller or a microprocessor (μP) 206, a random-access memory (RAM) 208, and an input/output (I/O) circuit 210, all of which are interconnected via an address/data bus 212. The program memory 204 may store computer-executable instructions, which may be executed by the microprocessor 206. In some embodiments, the controller 202 may also include, or otherwise be communicatively connected to, a database 214 or other data storage mechanism (e.g., one or more hard disk drives, optical storage drives, solid state storage devices, etc.). It should be appreciated that although FIG. 2 depicts only one microprocessor 206, the controller 202 may include multiple microprocessors 206. Similarly, the memory 204 of the controller 202 may include multiple RAMs 216 and multiple program memories 218, 218A and 218B storing one or more corresponding server application modules, according to the controller's particular configuration.

Although FIG. 2 depicts the I/O circuit 210 as a single block, the I/O circuit 210 may include a number of different types of I/O circuits (not depicted), including but not limited to, additional load balancing equipment, firewalls, etc. The RAM(s) 216, 208 and the program memories 218, 218A and 218B may be implemented in a known form of computer storage media, including but not limited to, semiconductor memories, magnetically readable memories, and/or optically readable memories, for example, but does not include transitory media such as carrier waves.

Figure 3:
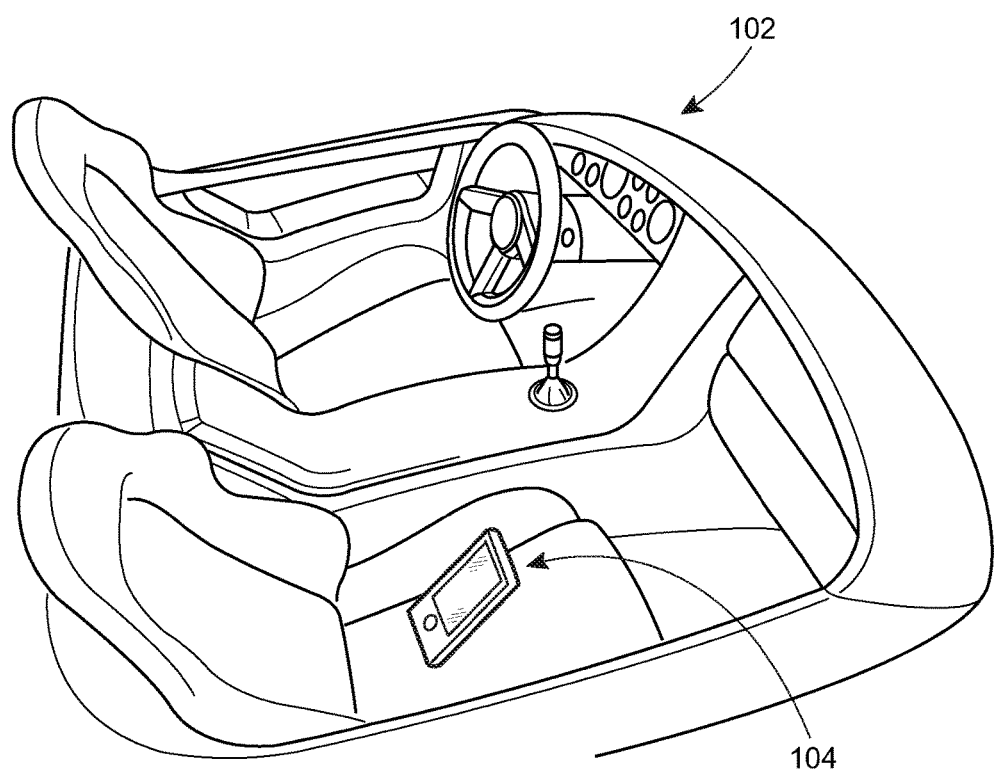
FIG. 3 illustrates a client computing device placed in a vehicle.

FIG. 3 illustrates a client computing device, such as the client computing device 104, placed in a vehicle, such as the car 102 depicted in FIG. 1. Although the vehicle in FIGS. 1 and 3 is a car, the techniques described in this application can be used with other vehicles, such as trucks, planes, boats, motorcycles, etc. The client computing device illustrated in FIG. 3 is placed perpendicular to the car, such that the x-, y- and z-axis of the client computing device are not properly aligned with the x-, y- and z-axis of the vehicle. In some embodiments, the client computing device 104 may be placed in another position in the vehicle. Furthermore, in some embodiments, the placement of the client computing device may shift during a trip made by the vehicle, a person may pick up the client computing device, etc. The client computing device 104 may use a sensor, such as the accelerometer 112, to collect and/or record four basic types of driving related g-forces that help uniquely identify a driving pattern. These are g-forces associated with acceleration, braking, left and right turns.

The client computing device 104 and/or the data server 128 may execute an instruction to convert raw accelerometer data into a useable format before the data can be analyzed to determine driving patterns. For example, the raw accelerometer data may include the movement of the vehicle (primary movement) as well as the movement of the client computing device in relation to the vehicle (secondary movement). In some embodiments, the client computing device may move around or bounce on a seat, dashboard, etc. while the vehicle is in motion. Before any meaningful driving patterns can be extracted from the data, the secondary movement must be removed from the primary movement. Furthermore, the orientation of the client computing device in comparison to the vehicle may change during the course of the trip.

Accordingly, if a processor of a data server, such as the data server 128 illustrated in FIG. 1 executed an instruction or set of instructions to analyze telematics data recorded by the client computing device 104, the analysis may be incorrect, because the client computing device is not oriented properly with the vehicle. The methods and systems described in this application demonstrate some embodiments of techniques which may be used to orient telematics data recorded by the client computing device, such that a processor analyzing the telematics data may orient the client computing device 104 with the vehicle 102.

Figure 4:
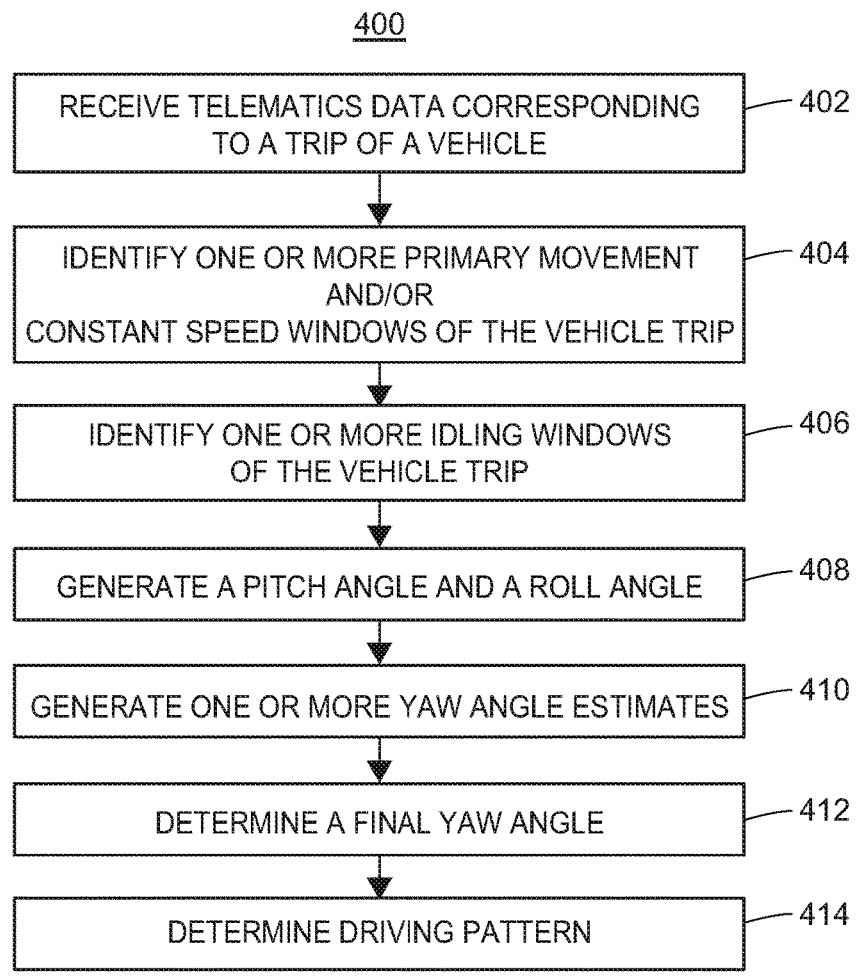
FIG. 4 is a flowchart illustrating an exemplary method for determining driving pattern data according to an embodiment.

FIG. 4 is a flowchart of a method, routine, algorithm or process 400 for using driving data to determine a driving pattern. The method 400 may be performed by the processor of a client computing device 104, a data server 128, etc. The processor may execute an instruction stored in memory to receive a plurality of telematics data corresponding to a trip of a vehicle (block 402). The plurality of telematics data may be received via a computer network, such as the internet. The plurality of telematics data may originate from a client computing device 104 that collects telematics data using one or more of the sensors. For example, the accelerometer 112 of the client computing device may be used to capture and/or record data at a specified sample rate, for example, 1 Hz, 40 Hz, 50 Hz, etc. In some embodiments, a sample rate of more than 1 sample per second may be used. In some embodiments, the processor may execute an instruction to collect accelerometer data every second, 30 seconds, minute, etc. In some embodiments, the processor of the client computing device may collect data for a certain period of time before transmitting the data and/or performing analysis, such as, for example, every day, every week, every month, etc.

The processor of the client computing device may execute an instruction to identify primary movement windows and/or constant speed windows of the vehicle trip from the plurality of telematics data (block 404). More specifically, the processor may execute an instruction to separate the plurality of telematics data into primary and secondary movement data, and remove the secondary movement data from the dataset. For example, as part of executing this instruction, the processor may receive an x-axis accelerometer value, a y-axis accelerometer value and a z-axis accelerometer value. In some embodiments, the processor may receive a function of the accelerometer data, such as the mean of x-axis accelerometer values over a certain time interval (such as one second), etc. The processor may also execute an instruction to flag a value indicating when device movement is detected. For example, the processor may set a binary indicator equal to one. Techniques for determining/identifying one or more primary movement windows are discussed in further detail.

At one or more points during execution of the method 400, the processor may also execute an instruction to determine whether GPS data is available. The processor may execute a further instruction to determine if the available GPS data is accurate. More specifically, the processor may analyze an indication of the GPS speed and the GPS accuracy, and execute an instruction to determine if the GPS data is available and accurate. The processor may further execute an instruction to output a value indicating that the GPS data is available and accurate. For example, the processor may execute an instruction to determine if the GPS accuracy level meets a desired threshold level and flag a certain value (such as a binary value) if the GPS accuracy level meets a desired threshold level and flag a second value (such as a binary value set to 0) if the GPS accuracy level does not meet a desired threshold level. Accordingly, in some embodiments the accelerometer data may be augmented by the GPS data.

The processor may further execute an instruction to separate the telematics data into one or more trip segments. For example, the processor may determine that device movement is detected and may execute an instruction to create a new trip segment in memory as well as an identifier for the trip segment. In some embodiments, the processor may execute an instruction to make a trip based on data originating from a GPS and/or data originating from an accelerometer. Techniques for determining primary and secondary movement data are discussed in further detail below.

The processor may also execute an instruction to identify one or more idling windows of the vehicle trip (block 406). In some embodiments, the processor may also execute an instruction to identify an idling time of a vehicle using the accelerometer data. The processor may execute an instruction to determine the standard deviation of the x-axis accelerometer values over a one second interval. Similarly, the processor may also execute an instruction to determine the standard deviation of the y-axis and/or z-axis accelerometer values over a one second interval as well. The processor may execute an instruction to determine when the vehicle has stopped, and to flag a value indicating when device movement is detected. For example, the processor may set a binary indicator equal to one. Techniques for determining idling times are discussed in further detail below.

At one or more points during the method 400, the processor may also execute an instruction to remove any noise or outliers. A variety of methods to remove noise and outliers from data are known in the art and will not be further described for the sake of brevity. The processor may execute an instruction to analyze the primary movement data and generate a pitch angle and a roll angle (block 408).

For example, the processor may execute an instruction to determine one or more initial values for pitch and roll. For example, the processor may receive as inputs telematics data in an x-axis accelerometer value, a y-axis accelerometer value and a z-axis accelerometer value. In some embodiments, the processor may receive a function of the accelerometer data, such as the mean of x-axis accelerometer values over a certain time interval (such as one second), etc. The processor may then execute an instruction to determine final pitch and roll angles. More specifically, the processor may execute an instruction to rotate the x-, y- and z-axis data by the estimated pitch and roll angles. For example, the processor may determine the optimal combination of pitch and roll angles that produces the maximum amount of data points in the XY plane within a predefined radius of the origin. In this manner, the processor may determine the final pitch and roll angles that best align gravity with the Z-axis. In some embodiments, the instruction may include an offset with the estimated pitch and roll angles.

The processor may further execute an instruction to rotate the telematics data by the final pitch and roll angles to produce rotated x-axis data and rotated y-axis data. In this manner, gravity is rotated out of the two dimensions and data depicts the phone as "flat" with respect to the vehicle. Techniques for generating a pitch and a roll angle are discussed in further detail below.

The processor may also execute an instruction to analyze the primary movement data and generate one or more yaw angle estimates (block 410) and determine a final yaw angle (block 412) from the one or more yaw angle estimates. For example, the processor may execute an instruction to determine one or more yaw angles. The processor may analyze the rotated x-axis data and the rotated y-axis data and further execute an instruction to rotate the inputs through a 90° range and select an optimal yaw angle. In some embodiments, the processor may further execute an instruction to determine an azimuth value. For example, the azimuth value may be the angle of the client computing device's y-axis east of magnetic north and be an angle between 0° and 360°. The processor may then execute an instruction to determine one or more candidate angles. For example, the candidate angles may be the optimal angle plus an offset angle. The offsets may be a value of 0°, 90°, 180° and 270°. The processor may further execute an instruction to compute a correlation between the lateral G forces and azimuth change for each of the four candidate angles and identify the angle that maximizes the correlation. The processor may further execute an instruction to identify the angle that maximized the correlation as the final yaw angle. Techniques for generating a pitch and a roll angle are discussed in further detail below.

The processor may execute an instruction to determine one or more driving patterns (block 414) and use at least this information to determine an insurance risk. In some embodiments, the processor may execute an instruction to determine an auto insurance risk using at least one or more constant speed time windows. In some embodiments, the processor may execute an instruction to use the driving patterns to determine one or more driving characteristics of a driver associated with an insurance account. For example, the processor may execute one or more instructions to determine that at least the pitch, roll and yaw angles are indicative of at least one of an acceleration event, a braking event, a left turn event and a right turn event. The processor may also execute an instruction to determine a risk level of the driver associated with the insurance account based on the driving characteristics and/or driving patterns. The processor may also execute an instruction to determine one or more insurance premiums based on the risk level.

Figure 5A:
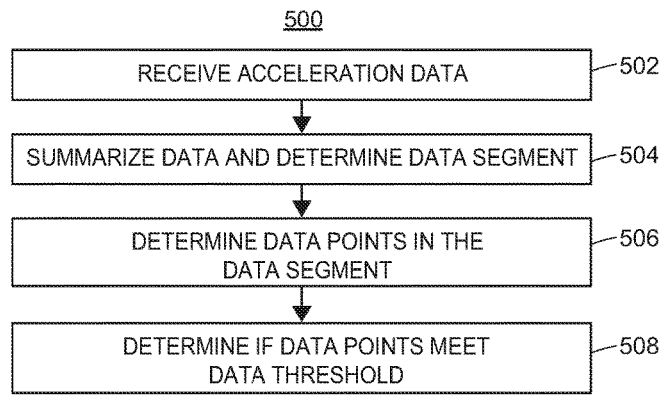
FIG. 5A is a flowchart illustrating an exemplary method for extracting information contained in a non-random time series signal for use in determining one or more driving patterns.

FIG. 5A is a flowchart of a method, routine, algorithm or process 500 for extracting information contained in a non-random time series signal for use in determining one or more driving patterns. The method 500 may be used to perform time domain or spectral domain analysis on telematics data collected from one or more sensors, such as an accelerometer of a smart phone, tablet, smart watch, etc. The method 500 may be performed by the processor of a client computing device 104 and/or a data server 128.

Generally speaking, accelerometers may record data in three axes, lateral (X-axis), longitudinal (Y-axis) and force of gravity (Z-axis). However, because the raw accelerometer data is recorded from a client computing device, the orientation of the device in relation to the vehicle is unknown. Accordingly, before the raw accelerometer data has any meaning (i.e., what data is from what axis), the device must be oriented in relation to the car. The method 500 may be used to identify primary movement versus secondary movement, accelerated data versus non-accelerated data, etc.

As discussed above, the accelerometer of the client computing device may record data at a certain sample rate. The processor of the data server, such as the data server 128, may receive the raw accelerometer data (block 502) at the specified sample rate, for example, 1 Hz, 40 Hz, 50 Hz, etc. The processor may execute an instruction to summarize the data at a desired sample level and split the data into temporal segments or windows (block 504). For example the data could be summarized at 1 Hz and each segment can be 64 seconds. Of course, this is for example only, and any sample level and segment length may be used. As a further example, the data can be summarized for the trip, at a day level, month level, year level, etc. The processor may also execute an instruction to determine the three data points in the data segment (block 506) and determine if the three data points meet a data threshold (block 508). In some embodiments, the processor may execute an instruction to find an amplitude and a cross-periodogram for each segment for all possible frequencies and/or over all frequencies. The processor may also execute an instruction to store these values for every segment.

Figure 5B:
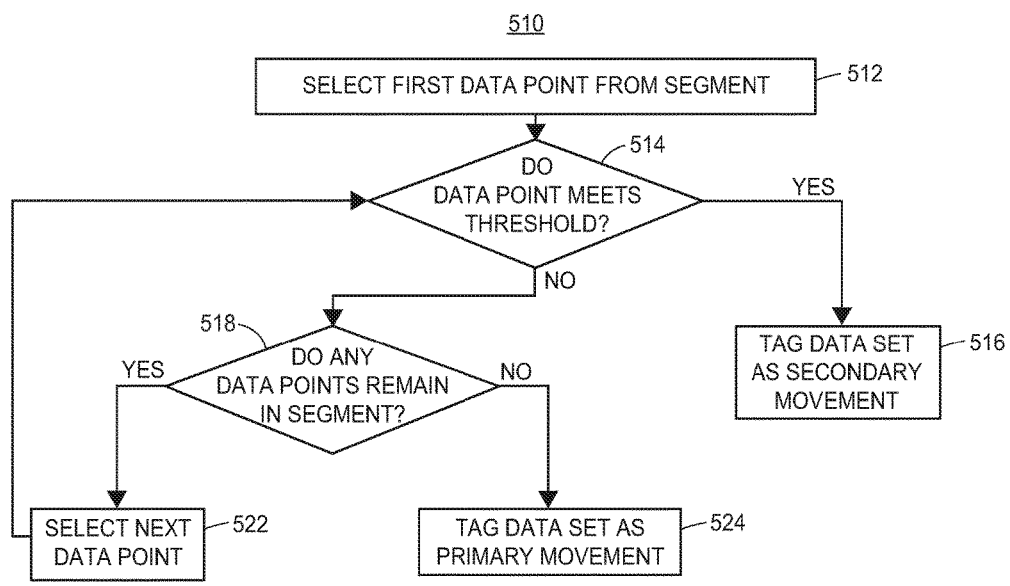
FIG. 5B is a flowchart illustrating an exemplary method for determining if a plurality of data points meet a data threshold.

Turning now to FIG. 5B, an example method 510 for determining if the three data points meet the data threshold is presented. The method 510 may be used, for example, to determine if a data segment contains primary movement data or secondary movement data. Two types of movement measured by an accelerometer inside a driving vehicle are primary movement data and secondary movement data. Primary movement data is data recorded when the accelerometer is static with respect to the vehicle and measures the vehicle's acceleration/braking and left/right turns. Secondary movement data is recorded when the accelerometer is moving with respect to the vehicle. Because of this, secondary movement data is considered invalid for identifying vehicles acceleration/braking and left/right turns. Identifying primary versus secondary movement data is crucial in orienting the accelerometer device with the vehicle. Furthermore, the three orientation angles, pitch, roll and yaw which uniquely identify the orientation of an accelerometer device within a moving vehicle, are meaningful only for primary movement data.

In one embodiment, if at least one data point in the data segment is above a threshold value, then the data segment contains secondary movement data. The processor may execute an instruction to select a first data point from the data segment (block 512) and determine if the selected data point meets the threshold value (block 514). If the processor executing the instruction determines that the selected data point does meet the threshold value (YES branch of block 514), the processor may determine that the accelerometer is moving with respect to the vehicle and tag the data segment as secondary movement data. If the processor executing the instruction determines that the selected data point does not meet the threshold value (NO branch of block 514), the processor may determine if any data points remain in the segment (block 518) and may select the next data point (block 520), such as the second data point in the data segment. The processor may then repeat blocks 514-520 to compare each data point to the threshold until every data point is compared. If the processor determines that no data points meet the threshold value (NO branch of block 518), the processor executes an instruction to tag the data segment as primary movement data (block 524).

For example, the processor may execute an instruction to use the frequency decomposition of accelerometer signal. The time series data from the x-axis of any three axis accelerometer can be expanded as a sum of sine and cosine functions using the Fourier expansion defined as:

$$X_t = \frac{A_0^x}{2} + \sum_{k=1}^{m} A_k^x \cos(\omega_k t) + B_k^x \sin(\omega_k t).$$

In the above expression, t is the time subscript, $t=1, 2, \ldots, n$, n is the number of observations in the time series and $X_t$ are the n x-axis accelerometer data. The number of frequencies in the Fourier decomposition is m ($m=n/2$ if n is even; $m=(n-1)/2$ if n is odd), $A_k^x$, $B_k^x$ are the cosine and sine coefficients and $\omega_k$ are the Fourier frequencies: $\omega_k = 2\pi k/n$. Functions of the Fourier coefficients $A_k^x$, and $B_k^x$ can be plotted against frequency or wave length and are referred as periodograms. The amplitude periodogram is defined as:

$$J_k^x = n/2((A_k^x)^2 + (B_k^x)^2).$$

A kernel smoothed estimate of this amplitude periodogram is given as:

$$S_k^x = \Sigma_{j=-p}^{p} W_p J_{k+j}^x$$

Letting i represent the imaginary unit $\sqrt{-1}$, the cross-periodogram between x and y-axis is defined as:

$$J_k^{xy} = \frac{n}{2}[(A_k^x A_k^y + B_k^x B_k^y) + i(A_k^x B_k^y - A_k^y B_k^x)]$$

A kernel smoothed estimate of the amplitude cross-periodogram is defined as:

$$S_k^{xy} = |\Sigma_{j=-p}^{p} W_p J_{k+j}^{xy}|$$

The processor may execute an instruction to use an estimate, such as the smoothed estimates similar to the ones given by the equations above, from all the three x-, y- and z-axis accelerometer data to determine if the three data points meet the data threshold.

When the total time series data has n observations, (i.e. where $n>p$) then the processor may execute an instruction to split a sample into one or more segments where each segment has p observations. The processor may also execute an instruction to combine a segment with less than p observations with the previous segment. In some embodiments, the processor may execute an instruction to restrict p to be even. For any given segment the processor may execute an instruction to define the total spectral power matrix as:

$$T_l^{ij} = \Sigma_k S_k^{ij}.$$

In the above expression i and j represent the three axes, $\{x, y, z\}$, and l denotes a segment with p or more data points. The total spectral power is a measure of what is happening at various time series segments over time. When the cross spectral power is high beyond a certain threshold, that indicates a movement of the device different from normal vehicle driving. Normal vehicle driving will show up in at least one of the three axes of an accelerometer depending on the orientation of the accelerometer with respect to the driving vehicle. But when the device moves with respect to a vehicle, it will show up as rapid large changes in acceleration along multiple axes. The frequency and time scale at which such an event would occur would be different from a typical driving related acceleration event.

Figure 5C:
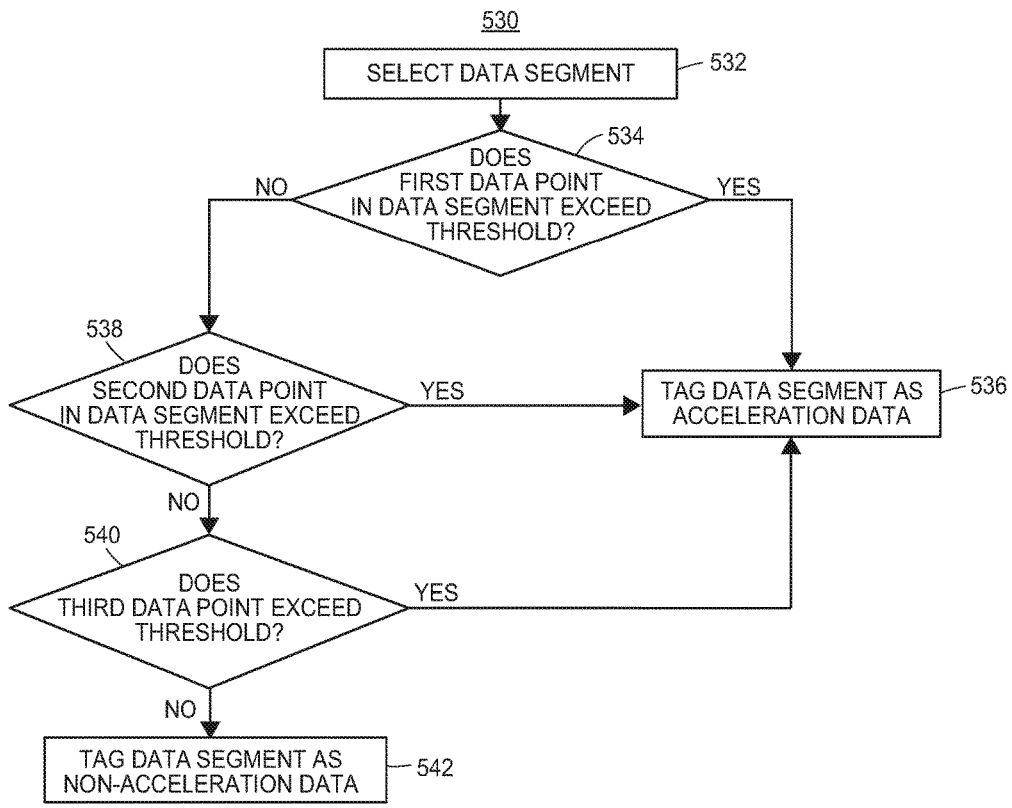
FIG. 5C is a flowchart illustrating another exemplary method for determining if a plurality of data points meet a data threshold.

Turning now to FIG. 5C, an example method 530 for determining if the three data points meet the data threshold is presented. The method 530 may be used, for example, to determine if a data segment contains acceleration data or non-acceleration data. Because there are various aspects that feed into determining a vehicle's driving pattern, driving environment (city versus highway), driving time (day versus night), driving style (speed, braking, etc.) may all influence the driving pattern. Some of these characteristics can be indirectly measured by measuring how often, during primary movement, a vehicle accelerates. Identifying total accelerated versus non-accelerated driving time is useful in determining driving environment and driving behavior, and thus, such a measure can help identify improved insurance premium.

In one embodiment, if all three data points in the data segment fall below a threshold value, then the data segment is mostly noise and should be tagged as non-acceleration data, or constant speed data. When the vehicle is not accelerated and when no secondary movement is present, the accelerometer will mostly measure noise and vehicle vibrations. The diagonal and off-diagonal elements of the total spectral power will be very low for a segment which is mostly noise. The processor may execute an instruction to use the diagonal and/or off-diagonal elements and logic with a suitable threshold to identify when the vehicle is moving with constant or zero speed during primary movement.

The processor may execute an instruction to select a first data point from the data segment (block 532) and determine if the selected data point meets the threshold value (block 534). If the processor executing the instruction determines that the selected data point does meet the threshold value (YES branch of block 534), the processor may determine that the data segment is acceleration data (block 636).

If the processor executing the instruction determines that the selected data point does not meet the threshold value (NO branch of block 534), the processor may select the second data point and determine whether the second data point meets the threshold value (block 538). If the processor executing the instruction determines that the second data point does meet the threshold value (YES branch of block 538), the processor may determine that the data segment is acceleration data (block 536). If the processor executing the instruction determines that the second data point does not meet the threshold value (NO branch of block 538), the processor may select the third data point and determine whether the second data point meets the threshold value (block 540). If the processor determines that the third data point does not meet the threshold value (NO branch of block 540), the processor executes an instruction to tag the data segment as non-acceleration data (block 542).

Figure 5D:
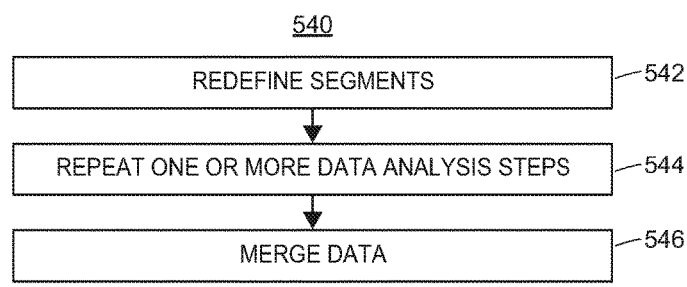
FIG. 5D is a flowchart illustrating another exemplary method for adjusting the extracted information contained in a non-random time series signal.

Turning now to FIG. 5D, an example method 540 is presented for adjusting the extracted information contained in a non-random time series signal for use in determining one or more driving patterns. In some embodiments, the processor may execute an instruction to redefine one or more segments to avoid segment boundary effects (block 544). For example, the processor may execute an instruction to redefine the segments by shifting down every segment by one data point or more. The processor may also execute an instruction to execute an instruction to re-analyze one or more data segments based on the redefinition (block 546). For example, the processor may execute an instruction to repeat one or more steps from the method 500, 510, 530, etc. The processor may also execute an instruction to merge the data (block 548). For example, the processor may execute an instruction to merge all segments back to the original time-stamped data. Since a data point could have appeared in various trailing segments, multiple secondary movement and constant speed indicators exist for any given data point.

Figure 6A:
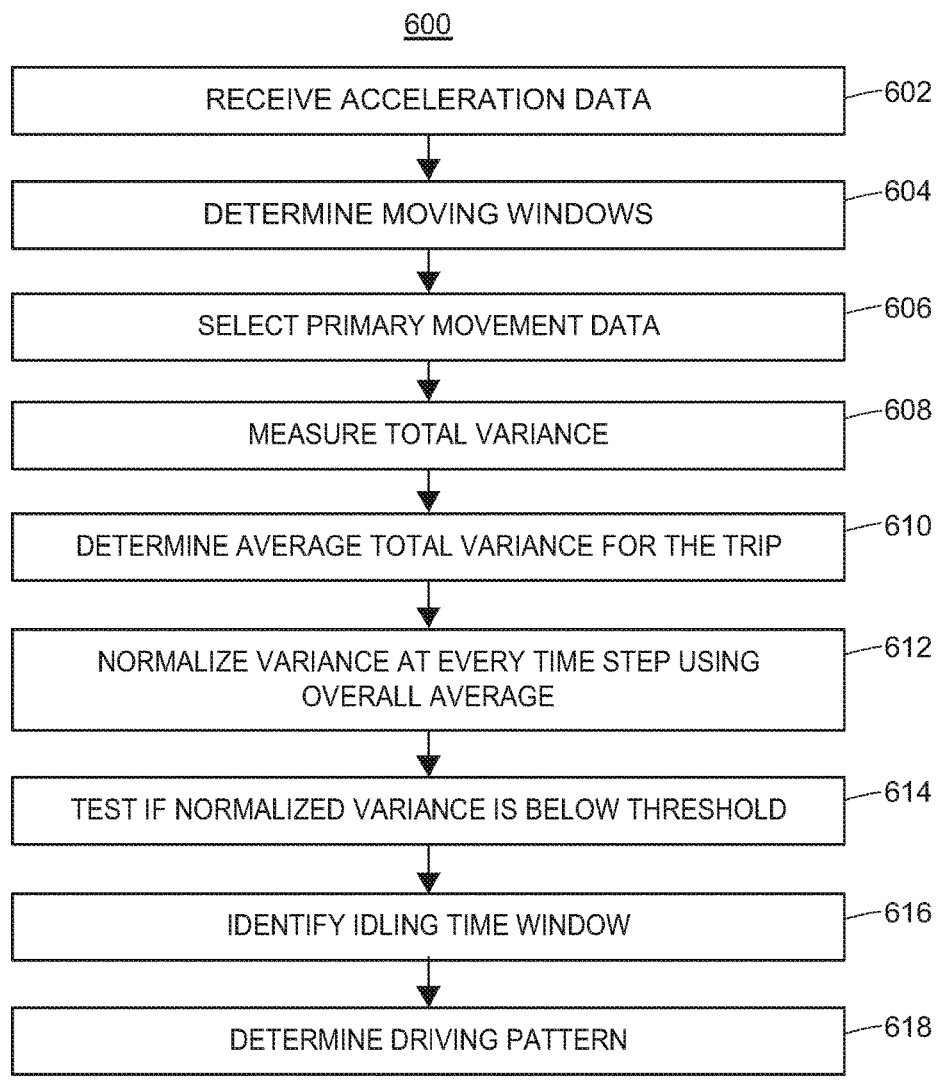
FIG. 6A is a flowchart illustrating an exemplary method for identifying idling times of a vehicle using accelerometer data.

FIG. 6A is a flowchart of a method, routine, algorithm or process 600 for identifying idling times of a vehicle using accelerometer data. The method 600 may be used to perform time domain or spectral domain analysis on telematics data collected from one or more sensors, such as an accelerometer of a smart phone, tablet, smart watch, etc. The method 600 may be performed by the processor of a client computing device 104 and/or a data server 128.

Time-stamped acceleration data, collected by an accelerometer sensor of a client device, can be used to identify various driving patterns of the vehicle. For example, the time-stamped acceleration data can be used to identify the idling times of a vehicle (i.e., when the vehicle is not moving). Because idling time can indicate the geography of a trip, idling time is a good measure of environment conditions under which a vehicle is being driven. For example, city driving trips tend to have frequent short interval idle times due to stop signs. Traditionally, most geographic ratings for auto insurance is based on the location where the vehicle is garaged. However, insurance policies can be more accurately priced for geography if the actual route is taken into consideration. Accordingly, the method 600 is used to determine driving patterns that may be considered when determining an auto insurance rating.

As discussed above, the accelerometer of the client computing device may record data at a certain sample rate. The processor of the data server, such as the data server 128, may execute an instruction to receive acceleration data from the client computing device (block 602). For example, in some embodiments the data server may measure the three axis accelerometer data from a device residing in the vehicle at the highest possible resolution for the entire trip of the vehicle. Next, the processor of the data server may execute an instruction to identify one or more primary movement windows of the trip (block 604). For example, the data server may execute an instruction to identify times when the device is not moving with respect to the vehicle (primary movement) and when it is moving with respect to the vehicle (secondary movement), as described in further detail in method 500 described above in reference to FIG. 5A. The data server may further execute an instruction to only analyze the primary movement data in subsequent steps of the method 600 (block 606).

Next, the processor of the data server may execute an instruction to measure the total variance from all three axis data at various time stamps (block 608). In some embodiments, the processor of the data server may execute an instruction to measure the total standard deviation in addition to, or instead of, the total variance. As described above, accelerometers may record data in three axes, the total variance is the sum of variance along the three axes and total standard deviation is the square root of total variance. The processor of the data server may also execute an instruction to determine the average signal total variance for the entire trip from all three axes (block 610) and normalize the total variance at various time stamps for the three axes using the overall average (block 612). Of course, the processor may also execute an instruction to find the average standard deviation and normalized standard deviation as well. As described above, idling time is a good measure of environment conditions under which a vehicle is being driven. Accordingly, the frequency of idling and total idling time are good proxies to classify the type of route a driver takes and hence a better measure for rating a policy based on driving environment. Next, the processor may also execute an instruction to test if the normalized variance is below a threshold level (block 614), and identify one or more idling time windows (block 616). For example, if the variance or standard deviation at a given time stamp is 40% below the overall average, then the processor may tag that data record as the vehicle idling.

In some embodiments, the processor may also execute an instruction to compare the idling time windows with additional vehicle idling time data. For example, the idling time could be obtained from GPS, accelerometer or from the vehicle's onboard diagnostic port.

The processor may execute an instruction to use the identified idling time windows to determine one or more driving patterns of the vehicle (block 618). For example, if there are few idling time windows, the processor may determine a driving pattern corresponding to highway pattern. In some embodiments, the processor may also execute an instruction to use at least the determined driving patterns to determine an auto insurance rating.

Figure 6B:
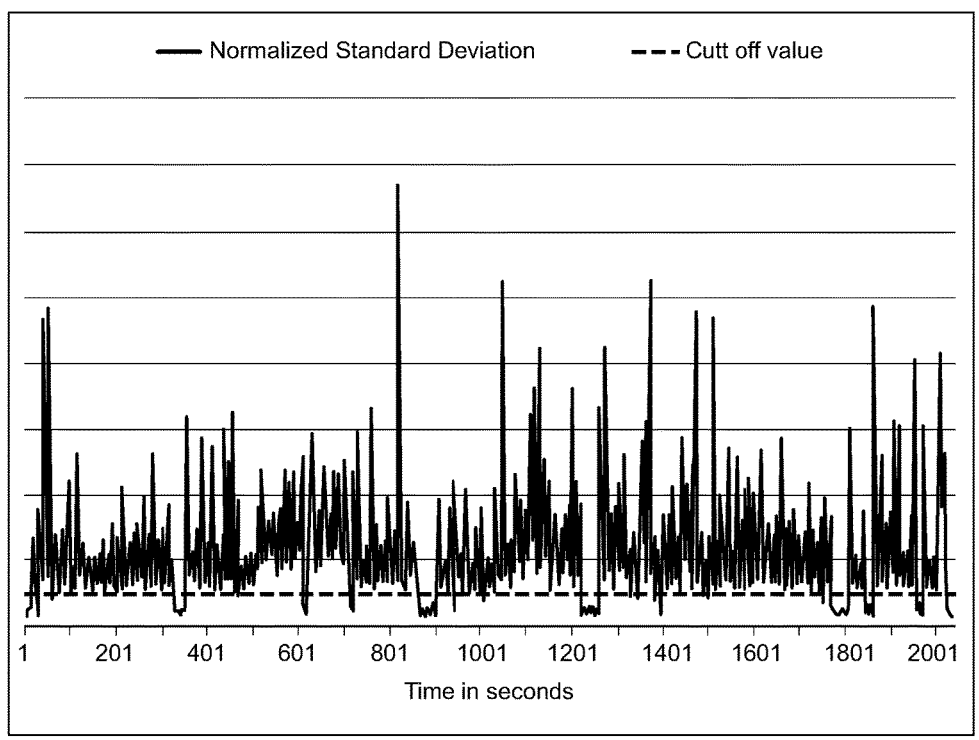
FIG. 6B a graph of the normalized standard deviation for every second of a vehicle trip.
Figure 6C:
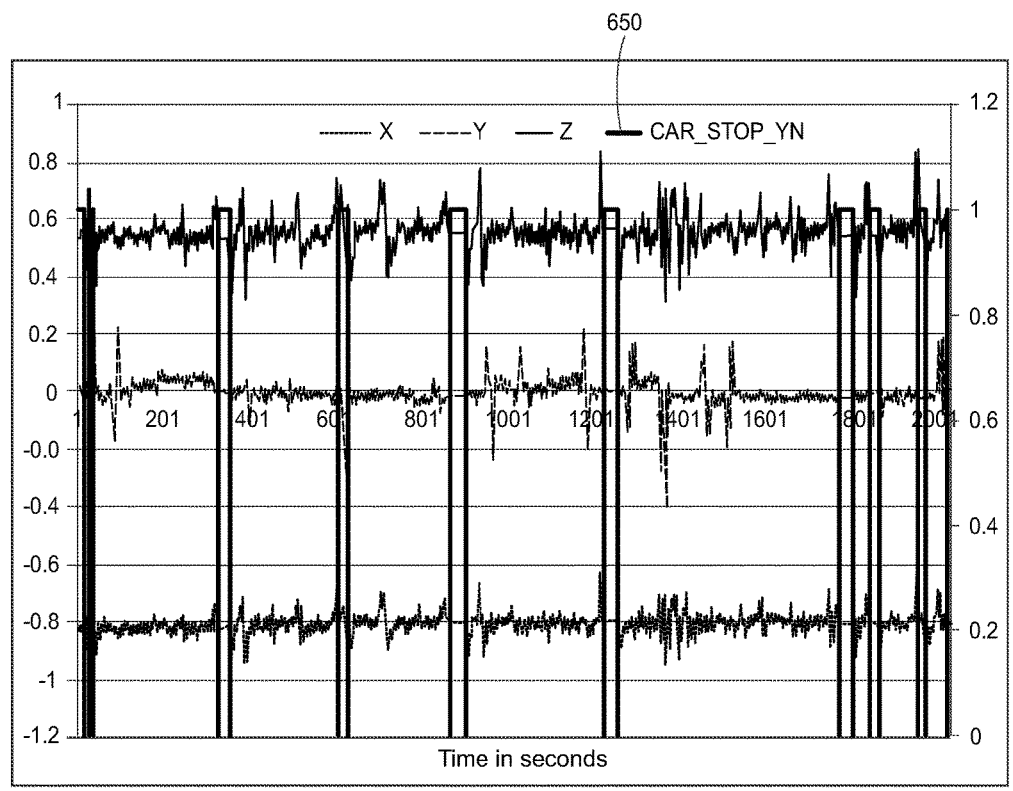
FIG. 6C is a graph depicting a three axis accelerometer signal and vehicle idling indicator as a function of time.

FIGS. 6A and 6C show a processor of the data server applying the method 600 to a sample driving data set. A total of about 33 minutes of driving and idling data was collected. In this example, the accelerometer data was measured using the accelerometer sensor in a smart phone. When the phone was not moving with respect to the vehicle, the accelerometer was measuring the vehicle's acceleration. When the phone was moving with respect to the vehicle (secondary movement data) such data was identified and removed from analysis.

FIG. 6B depicts a graph of the normalized standard deviation for every second of the trip. The dashed line shows the cutoff below which the data is identified as idling time.

FIG. 6C depicts a three axis accelerometer signal and vehicle idling indicator as a function of time. The plot shows ten temporal regions (650) where the vehicle was stopped or idling.

Figure 7A:
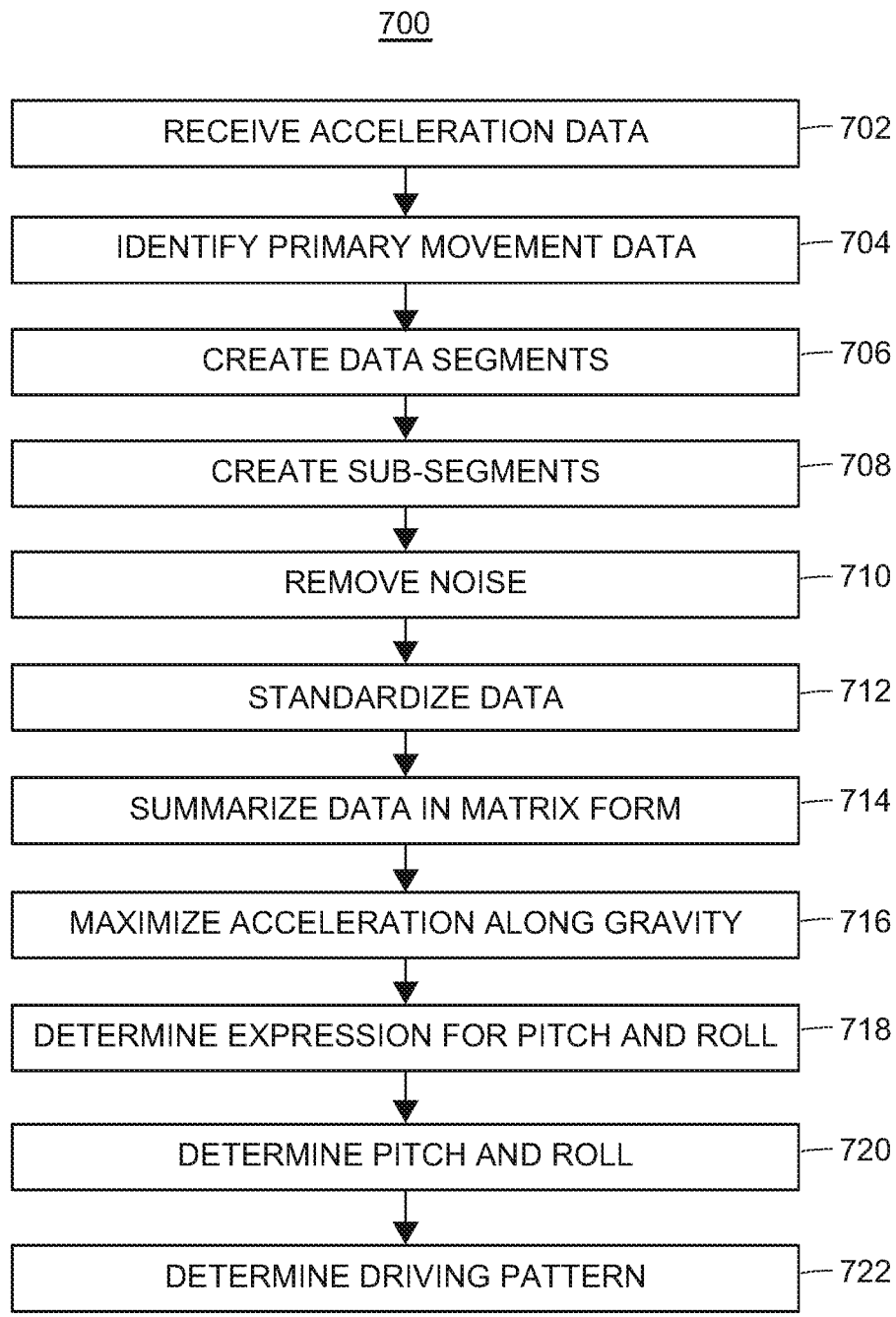
FIG. 7A is a flowchart illustrating an exemplary method for transforming raw accelerometer data into a form for use in determining a pitch and roll angle, and determining a driving pattern.

FIG. 7A is a flowchart of a method, routine, algorithm or process 700 for transforming raw accelerometer data into a form for use in determining a pitch and a roll angle, and determining a driving pattern. The method 700 may be performed by the processor of the client computing device 104 and/or the data server 128. The data server (such as the data server 128) described in reference to FIG. 1) may receive the raw telematics data from the client computing device (block 702). In some embodiments, the processor of the client computing device may receive the raw telematics data from a sensor of the client computing device, such as the accelerometer 112, etc. In some embodiments where a trip segment includes few or no acceleration events, the method may incorporate an assumption that the only substantive force acting on the phone is gravity. Thus, it should be true that the average value of the events along the x- and y-axis (representing forward/backwards motion and left/right motion, respectively) in reference to the vehicle should be zero. Accordingly, the method 700 may be useful in certain embodiments, such as when a particular trip segment contains few or no acceleration events.

Next, the processor of the data server may execute an instruction to identify primary movement data (block 704). For example, the data server may execute an instruction to identify times when the device is not moving with respect to the vehicle (primary movement) and when it is moving with respect to the vehicle (secondary movement), as described in further detail in the method 500 described above in reference to FIG. 5A. The data server may further execute an instruction to only use the primary movement data in subsequent steps of the method 700.

The processor may execute an instruction to create one or more data segments where the orientation of the device is static with respect to the vehicle (block 706). In some embodiments, if the created data segments are too long, the processor may also execute an instruction to create sub-segments (block 708). The processor may also execute an instruction to remove noise and/or other outlier data (block 710). The processor may also execute an instruction to combine the data points. For example, if the trip segment is a 14 minute trip segment and 60 data points have been recorded per each minute of the trip segment, there may be 840 total data points.

For each segment, the processor may execute an instruction to standardize the accelerometer data (block 712). For example, the processor may execute an instruction to standardize the data at a required Hz value.

As described above, the processor uses the method 700 to analyze accelerometer data from a vehicle to find the orientation of the vehicle with respect to Earth's gravity. The orientation angles are referred to as the device's pitch and roll angles, which relates it to a fixed axis. Furthermore, the orientation angles are used by the processor of the data server to separate out the acceleration due to ambient gravity versus the vehicle's acceleration. In the following example, the vehicle acceleration is denoted as $X_i'$, $Y_i'$ and $Z_i'$ where $X_i'$ and $Y_i'$ are the lateral and longitudinal directions respectively with the assumption that the vehicle's z-axis, $Z_i'$, is always aligned to Earth's gravity. The subscript i is used to denote the different timestamps. The accelerometer axes are denoted by $X_i$, $Y_i$ and $Z_i$ and the rotation along each axis of the accelerometer can be expressed in the matrix form as below:

$$R_x(\phi) = \begin{pmatrix} 1 & 0 & 0 \\ 0 & \cos\phi & \sin\phi \\ 0 & -\sin\phi & \cos\phi \end{pmatrix}$$

$$R_y(\theta) = \begin{pmatrix} \cos\theta & 0 & -\sin\theta \\ 0 & 1 & 0 \\ \sin\theta & 0 & \cos\theta \end{pmatrix}$$

$$R_z(\psi) = \begin{pmatrix} \cos\psi & \sin\psi & 0 \\ -\sin\psi & \cos\psi & 0 \\ 0 & 0 & 1 \end{pmatrix}$$

Figure 7B:
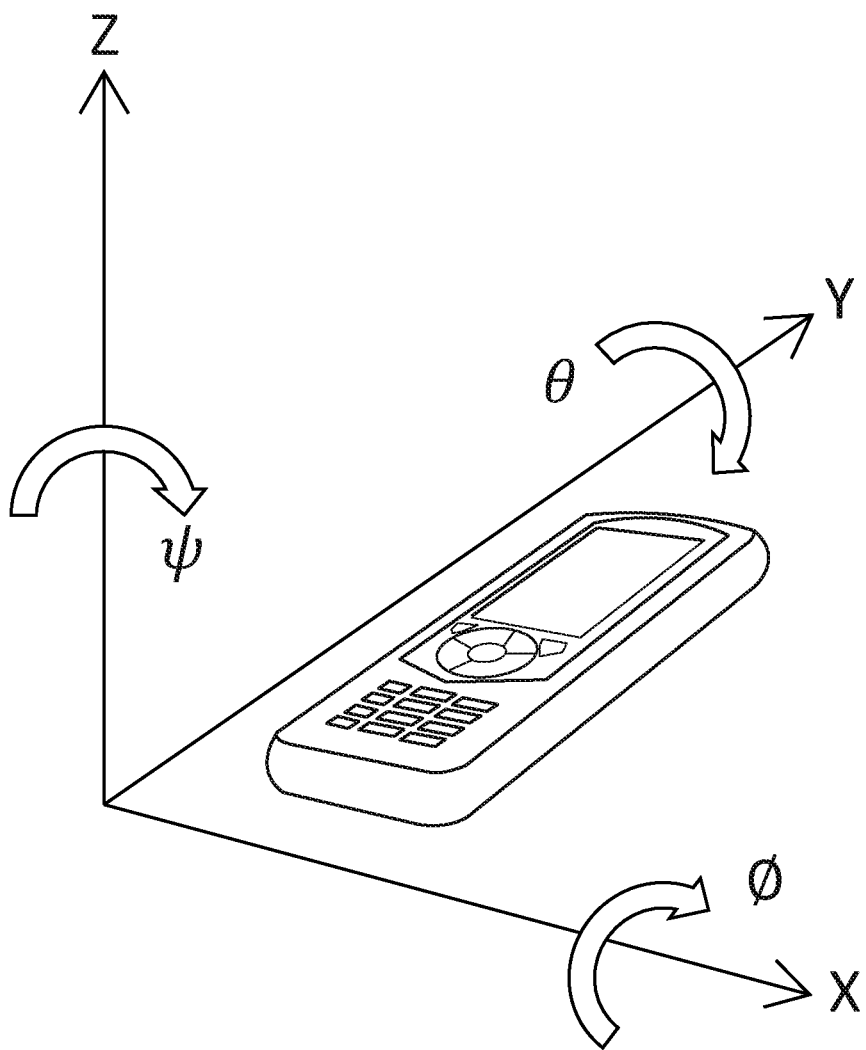
FIG. 7B depicts pitch, roll and yaw angles with respect to a three axis accelerometer in a smartphone.

The rotation about the x-axis is referred as pitch or elevation ($\phi$), the rotation about the y-axis is roll or bank ($\theta$) and rotation about the z-axis is the yaw or heading ($\psi$). FIG. 7B shows these angles with respect to a three axis accelerometer in a smartphone. Using these angles the mathematical relation between a vehicle's orientation and the device's orientation is given below:

$$\begin{pmatrix} X_i' \\ Y_i' \\ Z_i' \end{pmatrix} = R_z(\psi)R_x(\phi)R_y(\theta) \begin{pmatrix} X_i \\ Y_i \\ Z_i \end{pmatrix}$$

$$\begin{pmatrix} X_i' \\ Y_i' \\ Z_i' \end{pmatrix} = R_z(\psi) \begin{pmatrix} \cos\theta & 0 & -\sin\theta \\ \sin\theta\sin\phi & \cos\phi & \cos\theta\sin\phi \\ \sin\theta\cos\phi & -\sin\phi & \cos\theta\cos\phi \end{pmatrix} \begin{pmatrix} X_i \\ Y_i \\ Z_i \end{pmatrix}$$

The above relationships can be incorporated into an instruction executed by the processor to express a rotation matrix.

As described above, the method estimates pitch and roll by maximizing the sum of the squares of the force in the Z'-axis at each time stamp in order to produce rotation angles that will align the accelerometer's Z-axis with the direction of the force of gravity. For example, the processor may execute an instruction to maximize the function S, where:

$$S(a,b,c) = \Sigma_i (aX_i + bY_i + cZ_i)^2$$

The parameters a, b, and c represent the elements in a row of the rotation matrix, and as such are subject to the following constraint:

$$a^2 + b^2 + c^2 = 1$$

The method of Lagrange multipliers was used to maximize S subject to the constraint above. Expressing the data in terms of a matrix X where:

$$X = \begin{pmatrix} X_1 & Y_1 & Z_1 \\ \vdots & \vdots & \vdots \\ X_n & Y_n & Z_n \end{pmatrix},$$

The processor may also execute an instruction to summarize the data (block 714). For example, the processor may execute an instruction to summarize the data in the form of a matrix. In the above example, the solution is an eigenvector corresponding to the largest eigenvalue of the following matrix:

$$(X^T X) = \begin{pmatrix} \Sigma_i X_i^2 & \Sigma_i X_i Y_i & \Sigma_i X_i Z_i \\ \Sigma_i X_i Y_i & \Sigma_i Y_i^2 & \Sigma_i Y_i Z_i \\ \Sigma_i X_i Z_i & \Sigma_i Y_i Z_i & \Sigma_i Z_i^2 \end{pmatrix}$$

The processor may also execute an instruction to maximize the acceleration along gravity on the combined data point total (block 716). For example, the processor may execute an instruction to diagonalize the above matrix using any standard programming language and find the eigenvalues and eigenvectors. In another example, the processor may execute an instruction to measure an acceleration in the direction of gravity from the telematics data and maximize the measured acceleration in the direction of gravity.

The processor may execute an instruction to determine an expression for pitch and roll (block 718). In some embodiments, the instruction may incorporate an instruction that if the car is properly aligned with the client computing, (t) is equal to 1 G. For example, in the above matrix, the instruction executed by the processor may incorporate the eigenvector corresponding to the maximum eigenvalue and estimate pitch and roll. The processor may also execute an instruction to calculate this eigenvector $$\begin{pmatrix} a \\ b \\ c \end{pmatrix}.$$

For example, in the previous example, the processor executing the instruction obtains the following formulas for pitch ($\phi$) and roll ($\theta$), and the processor may execute an instruction to solve the above expression in terms of pitch and roll such that:

$$\phi = a\tan 2(-b, \text{sign}(c)\sqrt{a^2 + c^2})$$

$$\theta = a\tan(a/c)$$

The processor may further execute an instruction to determine pitch and roll by solving the expressions using the telematics data recorded by the client computing device (block 720). The processor may also execute an instruction to analyze the pitch and roll angles derived from the above expressions to determine one or more driving patterns (block 722). The processor may also execute an instruction to use at least the driving patterns to determine one or more auto insurance ratings, driving insurance premiums, etc. In some embodiments, the insurance premiums may be associated with a user account, such as the user account associated with the client computing device. For example, the processor may execute an instruction to use the driving patterns to determine one or more driving characteristics of a driver associated with an insurance account. The processor may also execute an instruction to determine a risk level of the driver associated with the insurance account based on the driving characteristics and/or driving patterns. The processor may also execute an instruction to determine one or more insurance premiums based on the risk level.

Figure 7C:
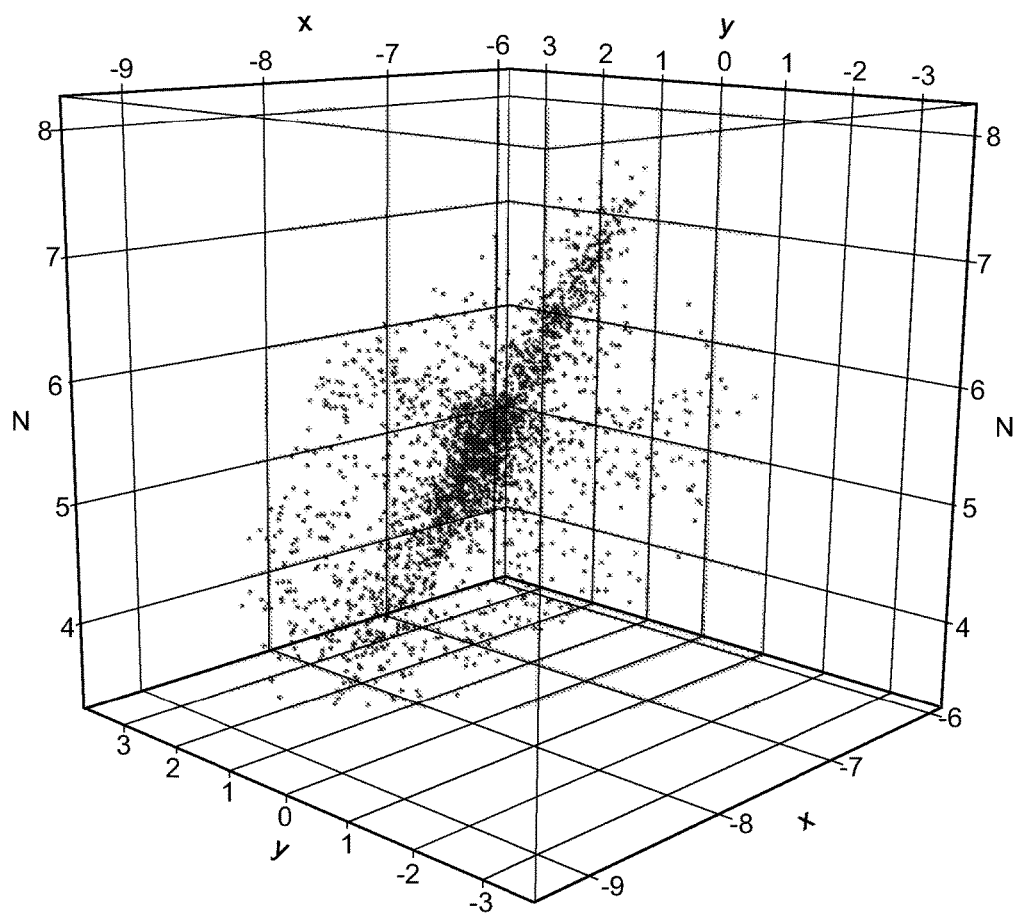
FIG. 7C depicts a 3D scatter plot showing the various acceleration events of a driving car measured by the three axis accelerometer in a client computing device.
Figure 7D:
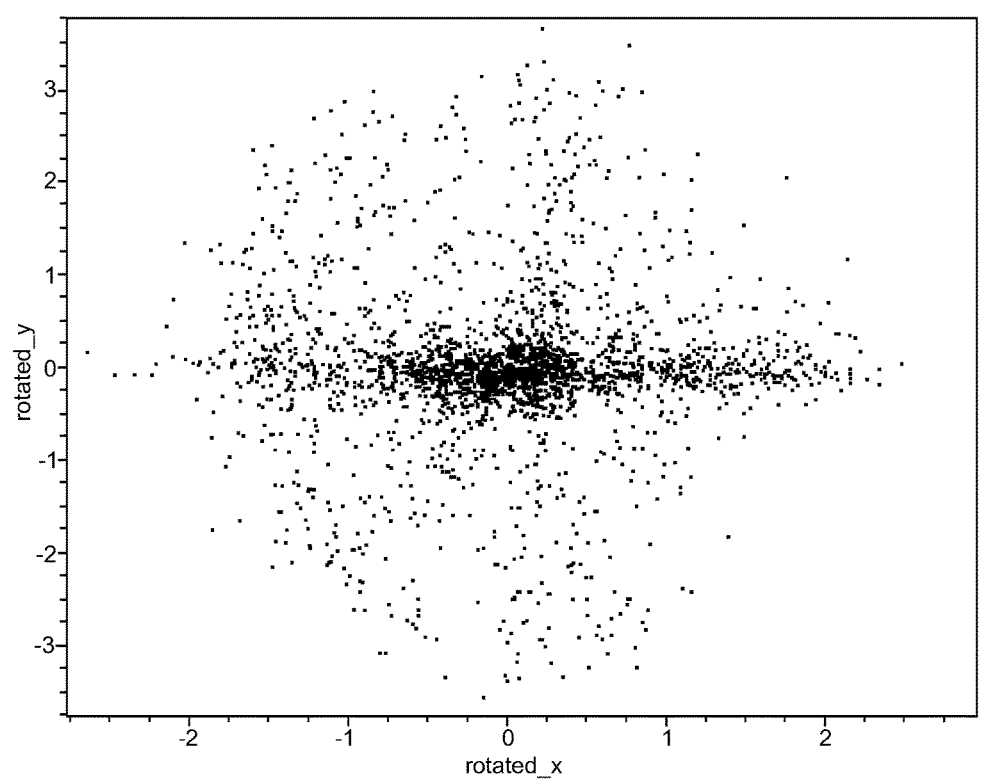
FIG. 7D depicts a scatter plot of acceleration events without gravitational acceleration.

FIGS. 7C and 7D show the results of the method applied on test data from a smart phone which was lying static in a moving car. The phone's accelerometer sensor is measuring both acceleration due to gravity and the vehicle's acceleration. FIG. 7C depicts a 3D scatter plot showing the various acceleration events of a driving car measured by the three axis accelerometer in a client computing device. FIG. 7D depicts a scatter plot of acceleration events without gravitational acceleration. For this data the measured pitch and roll angles were −0.23 degrees and −55.25 degrees respectively. FIG. 7D also shows the acceleration of the vehicle in a plane perpendicular to gravity which is obtained after estimating pitch and roll.

Figure 7E:
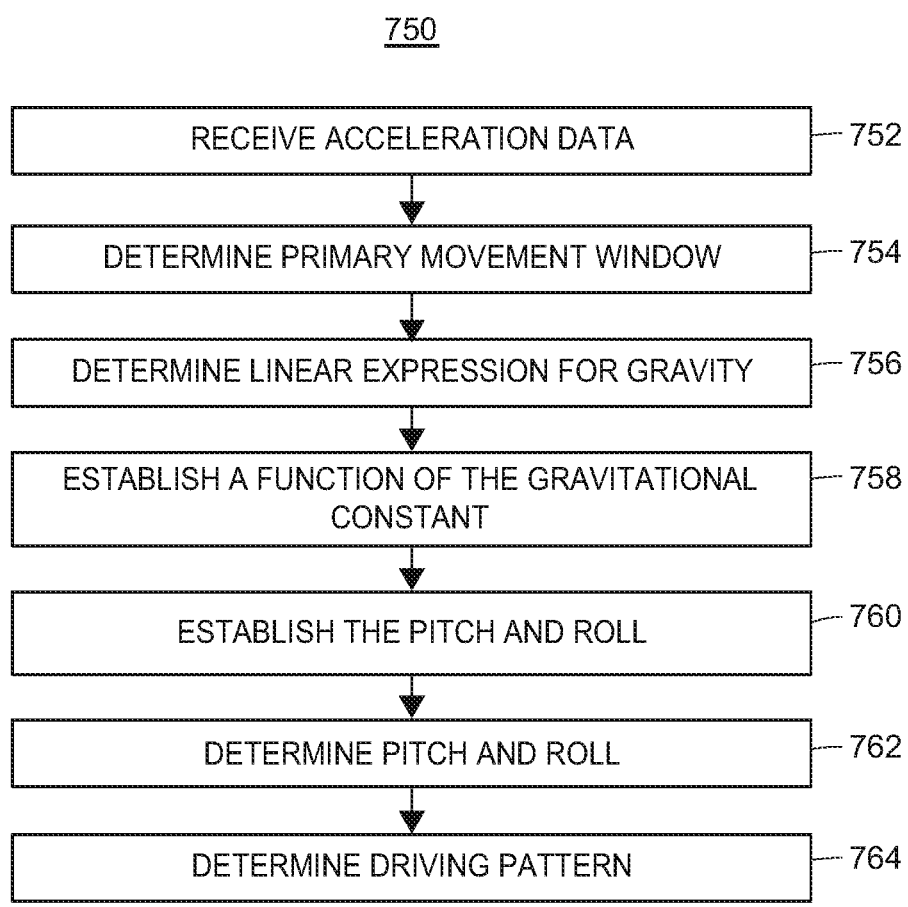
FIG. 7E is a flowchart illustrating an exemplary method for transforming raw accelerometer data into a form for use in determining a pitch and roll angle for use in determining a driving pattern.

FIG. 7E is a flowchart of a method, routine, algorithm or process 750 for transforming raw accelerometer data into a form for use in determining a pitch and a roll angle for use in determining a driving pattern. The method 700 may be performed by the processor of the client computing device 104 and/or a data server 128. The data server (such as data server 128 described in reference to FIG. 1) may receive the raw telematics data from the client computing device (block 752). In some embodiments, the processor of the client computing device may receive the raw telematics data from a sensor of the client computing device, such as the accelerometer 112, etc. A processor of the server may execute an instruction to analyze the data and split the data into one or more primary movement windows (block 754), as described above.

A processor of a server, such as the insurance server described in reference to FIG. 1, may execute an instruction to determine a linear expression for gravity (block 756). In some embodiments, the instruction may express pitch and roll using the expression:

$$Z_i' = \sin\theta \cos\phi X_i - \sin\phi Y_i + \cos\theta \cos\phi Z_i.$$

In some embodiments, the processor executing the instruction may also apply a matrix notation, such that:

$$X\vec{\beta} = \vec{C}_z$$

where:

$$\vec{\beta} = \begin{pmatrix} \sin\theta\cos\phi \\ -\sin\phi \\ \cos\theta\cos\phi \end{pmatrix},$$

$$Z' = \begin{pmatrix} Z'_1 \\ \vdots \\ Z'_n \end{pmatrix}$$

The instruction executed by the processor may incorporate an assumption that gravity is the only force acting on the vehicle's z-axis (according to the reference frame of the car) and the instruction may also incorporate an assumption that the force of gravity is constant. Accordingly, the processor may execute an instruction to estimate a gravitational constant from the telematics data. Though the gravitational assumption incorporated into the instruction may not hold true in some embodiments, due to bumps, vibrations, etc. during the trip of the vehicle, such deviations are typically minor and may be included in the margin of error of the method.

In some embodiments, the processor may also execute an instruction to factor out the constant. For example, if the constant is represented by $C_z$, the processor may execute an instruction to factor out the constant and derive the expression:

$$X\vec{\beta} = C_z \begin{pmatrix} 1 \\ \vdots \\ 1 \end{pmatrix}$$

The processor may also execute an instruction to establish a function of the gravitational constant (block 758). For example, the processor may execute an instruction to minimize the squared error in measured gravity. In some embodiments the processor may execute an instruction incorporating an ordinary least squares solution, though in some embodiments other techniques may be used. For example, given the above expression for $\vec{\beta}$, the processor may execute an ordinary least squares solution such that:

$$\vec{\beta} = (X^T X)^{-1} X^T \begin{pmatrix} 1 \\ \vdots \\ 1 \end{pmatrix} \bar{g}$$

In the above expression, the term $$(X^T X)^{-1} X^T \begin{pmatrix} 1 \\ \vdots \\ 1 \end{pmatrix}$$

may be dependent only on the data matrix X and $\bar{g}=C_z$. The processor may execute an instruction to reduce the above expression to a 3-by-1 vector. For example, the processor executing the instruction may set the vector to $$\begin{pmatrix} a \\ b \\ c \end{pmatrix}$$

creating the following expression:

$$\vec{\beta} = \bar{g} \begin{pmatrix} a \\ b \\ c \end{pmatrix}$$

The processor may also execute an instruction to establish the pitch and roll (block 760). For example, the processor may execute an instruction to establish pitch and roll via a least squares solution. For example, the processor may execute an instruction to incorporate one or more rotation matrix definitions, such as $\|\vec{\beta}\|=1$, in order to execute an expression for estimating $\bar{g}$:

$$\bar{g} = \frac{1}{\sqrt{a^2 + b^2 + c^2}}$$

The processor may execute an instruction to derive expressions for pitch ($\theta$) and roll ($\phi$) in terms of a, b, and c:

$\theta = a \tan(a/c)$ $\phi = a \tan 2(-b, \text{sgn}(c)\sqrt{a^2+c^2})$ The processor may further execute an instruction to solve the expression, determining the pitch and roll angles using the telematics data recorded by the client computing device (block 762). In some embodiments, the processor may also execute an instruction to compare the pitch and roll values determined by the method 750 with the pitch and roll values determined by the method 700, and determine if the difference is acceptable. The processor may further execute an instruction to select one set of pitch and roll values or determine the final values of pitch and roll using an additional function. In some embodiments, the processor executing the instruction may determine that the difference is unacceptable and execute an instruction to compare the results with traditional methods of estimating pitch and roll to choose a final value of pitch and roll.

The processor may also execute an instruction to analyze the pitch and roll angles derived from the above expressions to determine one or more driving patterns (block 764). The processor may also execute an instruction to use at least the driving patterns to determine one or more insurance premiums. For example, the processor may execute an instruction to use the driving patterns to determine one or more driving characteristics of a driver associated with an insurance account. The processor may also execute an instruction to determine a risk level of the driver associated with the insurance account based on the driving characteristics and/or driving patterns. The processor may also execute an instruction to determine one or more insurance premiums based on the risk level.

Figure 8:
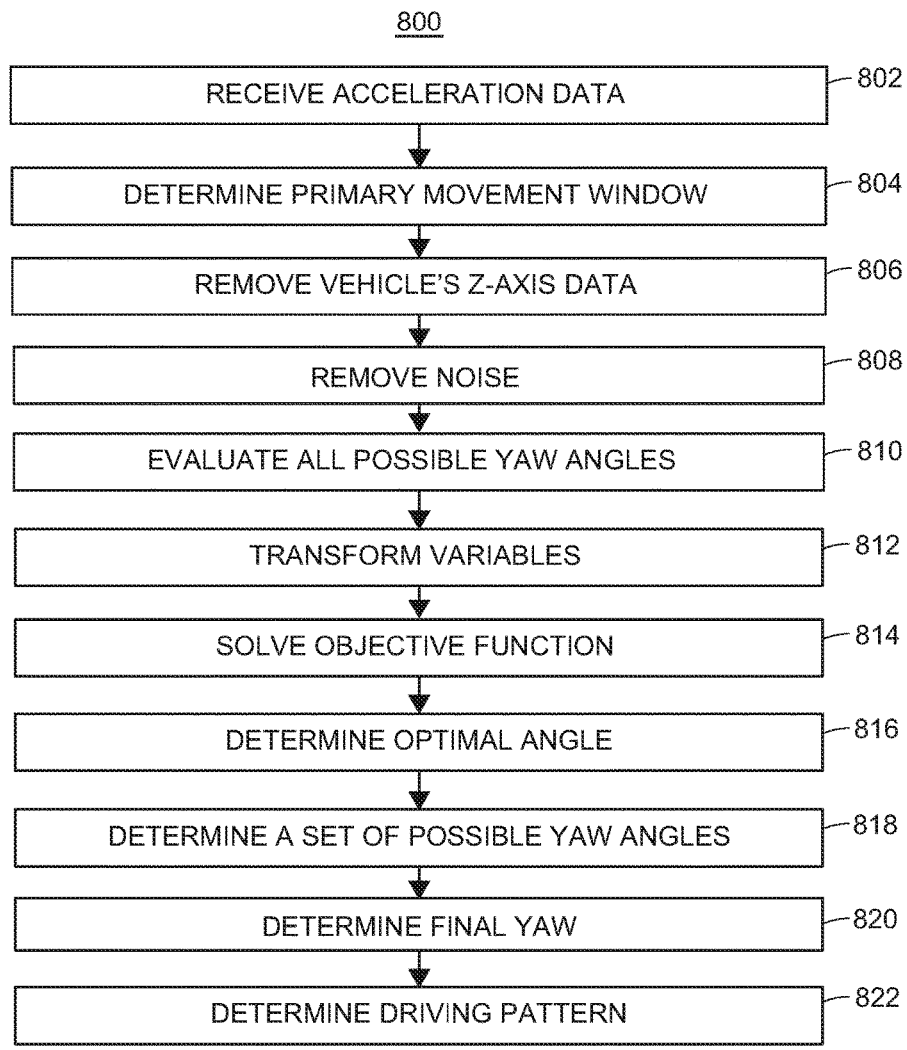
FIG. 8 is a flowchart illustrating an exemplary method for deriving driving patterns from telematics data according to an embodiment.

Turning now to the method 800 illustrated in FIG. 8, a method for determining a yaw angle and determining a driving pattern from telematics data collected from a client computing device is described. In some embodiments, a processor of the client computing device may receive the raw telematics data from a sensor of the client computing device, such as the accelerometer 112, etc. A data server (such as data server 128 described in reference to FIG. 1) may receive the raw telematics data from the client computing device (block 802). A processor of the server may execute an instruction to analyze the data and split the data into one or more primary movement windows (block 804).

A data server, such as the data server 128 described in reference to FIG. 1 may receive telematics data from a client computing device. The processor may further execute an instruction to derive pitch and roll angles from the telematics data, using, for example, the method 700 described in reference to FIG. 7A.

In the following, the vehicle acceleration is denoted as $X_i'$, $Y_i'$ and $Z_i'$, where $X_i'$ and $Y_i'$ are the lateral and longitudinal directions respectively and it is assumed that the vehicle's z-axis, $Z_i'$, is always aligned to Earth's gravity. The subscript i is used to denote the different timestamps. The accelerometer axes are denoted by $X_i$, $Y_i$ and $Z_i$ and the rotation along each axis of the accelerometer can be expressed in the matrix form as below:

$$R_x(\phi) = \begin{pmatrix} 1 & 0 & 0 \\ 0 & \cos\phi & \sin\phi \\ 0 & -\sin\phi & \cos\phi \end{pmatrix}$$

$$R_y(\theta) = \begin{pmatrix} \cos\theta & 0 & -\sin\theta \\ 0 & 1 & 0 \\ \sin\theta & 0 & \cos\theta \end{pmatrix}$$

$$R_z(\psi) = \begin{pmatrix} \cos\psi & \sin\psi & 0 \\ -\sin\psi & \cos\psi & 0 \\ 0 & 0 & 1 \end{pmatrix}$$

As discussed above, the rotation about the x-axis is referred as pitch or elevation ($\phi$), the rotation about the y-axis is roll or bank ($\theta$) and rotation about the z-axis is the yaw or heading. Using these angles the mathematical relation between a vehicle's orientation and the device's orientation is given below:

$$\begin{pmatrix} X_i' \\ Y_i' \\ Z_i' \end{pmatrix} = R_z(\psi) R_x(\phi) R_y(\theta) \begin{pmatrix} X_i \\ Y_i \\ Z_i \end{pmatrix}$$

If the direction of gravity is known with respect to the device's axis then the above equation can be rewritten as:

$$\begin{pmatrix} X_i' \\ Y_i' \\ Z_i' \end{pmatrix} = R_z(\psi) \begin{pmatrix} \overline{X}_i \\ \overline{Y}_i \\ Z_i' \end{pmatrix}$$

where:

$$\begin{pmatrix} \overline{X}_i \\ \overline{Y}_i \\ Z_i' \end{pmatrix} = \begin{pmatrix} \cos\theta & 0 & -\sin\theta \\ \sin\theta\sin\phi & \cos\phi & \cos\theta\sin\phi \\ \sin\theta\cos\phi & -\sin\phi & \cos\theta\cos\phi \end{pmatrix} \begin{pmatrix} X_i \\ Y_i \\ Z_i \end{pmatrix}$$

In the above equation, $\overline{X}_i$ and $\overline{Y}_i$ are acceleration events in the XY-plane of the vehicle. There are four possible types of acceleration that a vehicle commonly experiences: forward acceleration, backward acceleration or braking, right turns and left turns. If these acceleration events are plotted in the XY-plane of the vehicle, they will look like distributed points with four possible modes. The processor executing the method 800 may incorporate an assumption that at least one of these modes is clearly distinguishable from the rest.

Figure 10A:
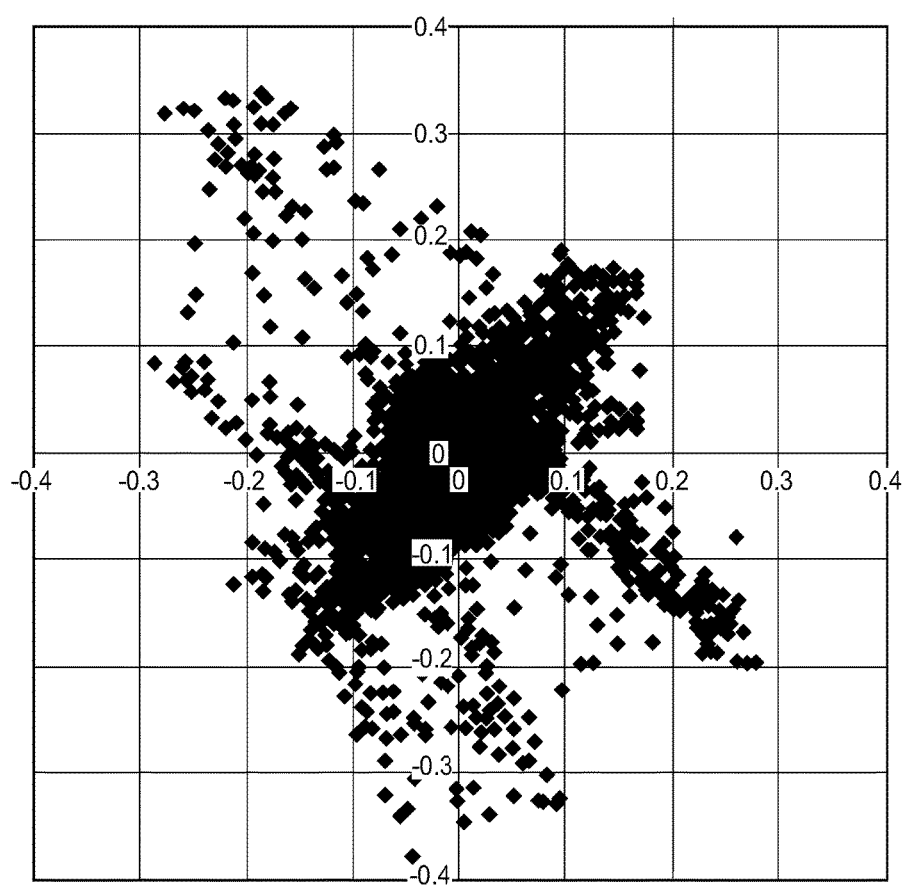
FIG. 10A is a graph depicting an example scatter plot of x and y data for a client computing device placed in a vehicle.

The processor may execute an instruction to remove vehicle's Z-axis data (block 806). In some embodiments the processor may execute an instruction to remove Z-axis data based on the pitch and roll angles. Turning briefly to FIG. 10A, a graph is depicted with an example scatter plot of x and y data for a client computing device placed in a vehicle (such as the client computing device 104 and vehicle 102 depicted in reference to FIG. 1). As previously discussed, a processor may not be able to meaningfully use this data to determine one or more driving patterns because the alignment of the client computing device is unknown in relation to the vehicle. In other words the direction (i.e. forward/backward, left/right) is unknown. In some embodiments, the instruction or set of instructions executed by the processor may incorporate an assumption that the most common direction points along the y-axis. In other words, the instruction may incorporate an assumption that the most common thing a driver does is to accelerate directly forward or backwards, as opposed to turning left or right.

Figure 10B:
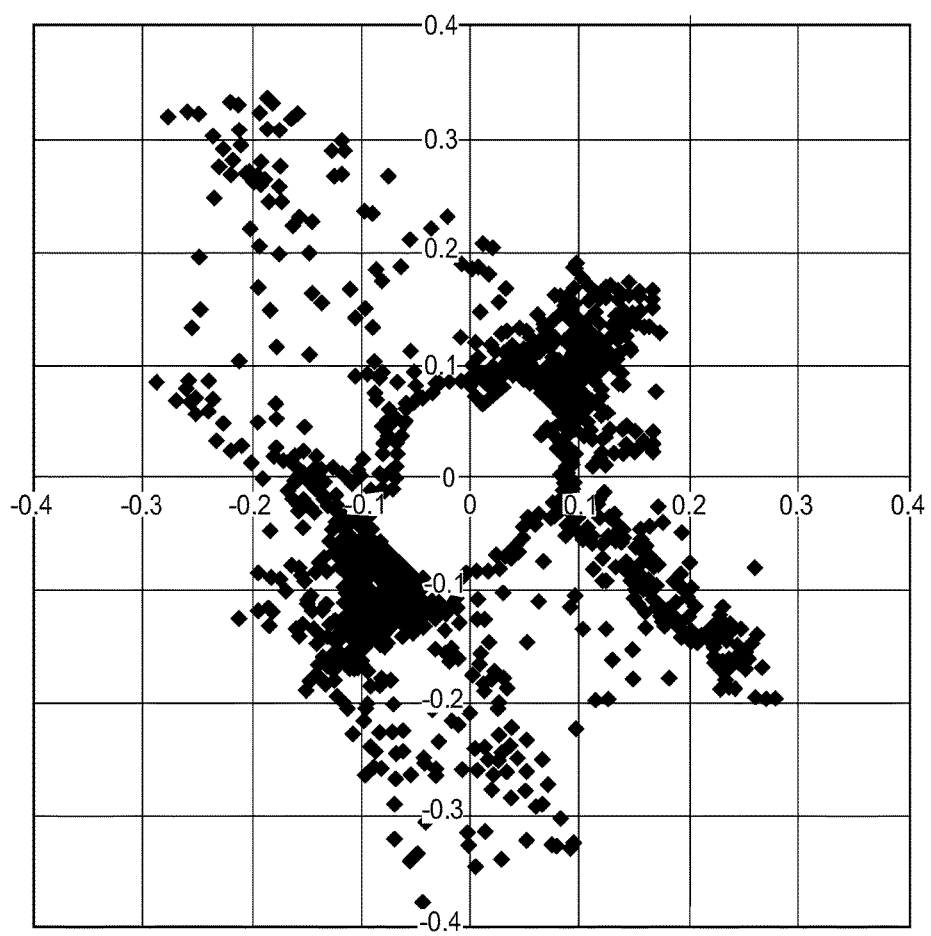
FIG. 10B is a graph depicting an example scatter plot of x and y data for a client computing device placed in a vehicle.

The processor may execute an instruction to exclude data points that do not constitute true events and/or that may be noise (block 808). For example, the processor may execute an instruction to remove any data that does not meet a certain data threshold. For example, the processor executing the instruction may remove vectors with magnitudes less than a cutoff c. In some embodiments, this may be expressed as $\overline{X}_i^2 + \overline{Y}_i^2 > c^2$. For example, the cutoff value c may be set as 0.1 G, though other cutoff values or expressions may be used. Turning briefly to FIG. 10B, a graph depicts a scatter plot of x and y data after the processor has executed an instruction to remove data points with a value less than 0.1 G from the scatter plot depicted in FIG. 10A.

In some embodiments, the instruction may incorporate an assumption that when the client computing device is properly oriented the correlation between the squares of the x and y data streams may be minimized. For example, this "correlation" may be represented as the sum of the products between $x^2$ and $y^2$. In some embodiments, the correlation may be expressed in the following equations, where the x and y variables represent the telematics data recorded by the client computing device after the force of gravity has been factored out:

$$\overline{X}_i^* = \frac{\overline{X}_i \cos\psi + \overline{Y}_i \sin\psi}{\sqrt{\overline{X}_i^2 + \overline{Y}_i^2}}$$

$$\overline{Y}_i^* = \frac{\overline{X}_i \sin\psi + \overline{Y}_i \cos\psi}{\sqrt{\overline{X}_i^2 + \overline{Y}_i^2}}$$

The processor may execute an instruction to evaluate all possible angles (block 810) given by $\mu_i = a\tan 2(\overline{Y}_i, \overline{X}_i)$. Furthermore, in some embodiments, the processor may also execute an instruction to transform the variables of the objective function (block 812). The processor may also execute an instruction to determine a solution that solves the objective function (block 814). In some embodiments, the processor may determine a solution that minimizes the objective function. For example, given the objective function $\Sigma_i \overline{X}_i^{*2} \overline{Y}_i^{*2}$, the processor may compute one or more equalities for $\psi$ that minimize the objective function. The processor may execute an instruction to apply the equality to the objective function in order to determine an optimal angle (block 816). For example, applying the equality to the objective function, may result in the optimal angle $\psi_0$ is given by:

$$\tan 4\psi_0 = \frac{\Sigma_i \sin 4\mu_i}{\Sigma_i \cos 4\mu_i}$$

In some embodiments, the optimal angle $\psi_0$ may be rewritten as:

$$\psi_0 = \frac{1}{4} \tan 2(\Sigma_i \sin 4\mu_i, \Sigma_i \cos 4\mu_i).$$

As previously discussed, there are two components of data (x and y) representing forward/backwards motion and left/right motion, respectively. Accordingly, there are four effects represented by the data. Furthermore, each of the effects is approximately 90 degrees from each other. However, the processor executing the instruction may not be able to determine which data corresponds to which effect. The optimal angle expressed above creates a function which puts all four effects (forward, backward, left and right) into one "direction." In this way, a processor can execute one or more instructions to perform one or more analyses on the data without determining which data stream corresponds to which effect. This should mean that it would not matter, for example, if someone took all right turns, since right and left turns would now be "folded" into the same direction. In the example shown below the folded angle is represented by the quadruple angle in the sine and cosine functions. This has the effect of putting the effects of forward acceleration, backward acceleration, left turns, and right turns in the same "direction" since:

$$\sin 4(\delta + 90°) = \sin 4\delta \forall \delta$$

$$\cos 4(\delta + 90°) = \cos 4\delta \forall \delta$$

The processor may execute an instruction to solve for the optimal angle $\psi_0$ by taking an angular average of four times the $\mu_i$'s (the directions of all the vectors in the XY-plane). If an angular average were taken of the $\mu_i$'s without multiplying them by four, the effects of the four different modes would corrupt each other in the angular average and create an undesirable solution. Since these modes are at ninety degree angles to one another, multiplying each $\mu_i$ by four will align them since sine and cosine repeat every 360 degrees (sin $4\mu_i$ and cos $4\mu_i$ will be equal for all $\mu_i$'s that differ by integer multiples of 90 degrees). This solution gives an angle $\psi_0$ that has a domain spanning ninety degrees. The processor may also execute an instruction to determine a set of possible yaw angles (block 818). For example, the processor may further expand the domain to create four possible solutions; $\psi_0$, $\psi_0 + \pi/2$, $\omega_0 + \pi$ and $$\psi_0, \psi_0 + \frac{\pi}{2}, \psi_0 + \pi \text{ and } \psi_0 + \frac{3\pi}{2}$$

(block 818). The processor may further execute an instruction to count how many $\mu_i$'s are within five degrees of $\psi_0$ and $$\psi_0 + \frac{\pi}{2}.$$

The processor may determine the optimal output of the method based on whichever has the greater count is considered the output from this method.

The processor may then execute an instruction to determine the yaw angle ($\psi$) (block 820). The processor may also execute an instruction to use at least the yaw angle to determine one or more driving patterns (block 822). The processor may also execute an instruction to use at least the driving patterns to determine one or more insurance premiums. In some embodiments, the insurance premiums may be associated with a user account, such as the user account associated with the client computing device. For example, the processor may execute an instruction to use the driving patterns to determine one or more driving characteristics of a driver associated with an insurance account. The processor may also execute an instruction to determine a risk level of the driver associated with the insurance account based on the driving characteristics and/or driving patterns. The processor may also execute an instruction to determine one or more insurance premiums based on the risk level.

Figure 9:
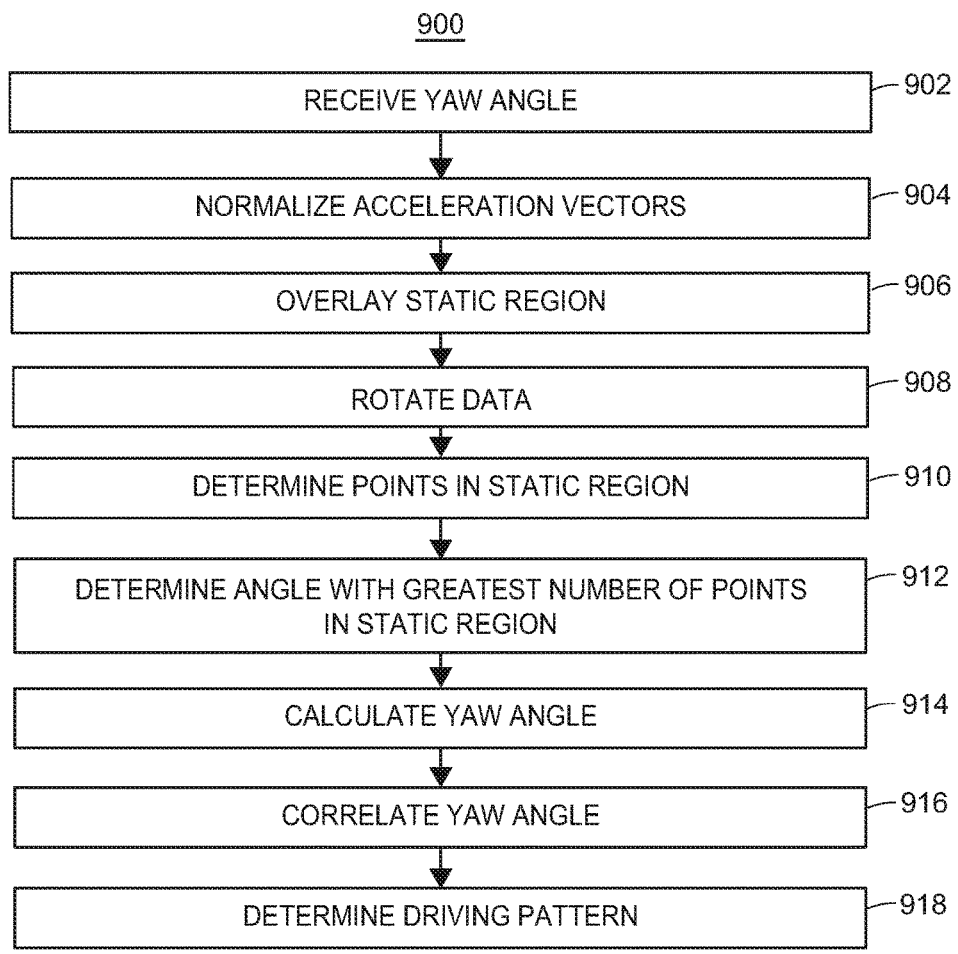
FIG. 9 is a flowchart illustrating an exemplary method for transforming raw accelerometer data into a form for use in determining a yaw angle and determining a premium and a driving pattern.

FIG. 9 is a flowchart of a method, routine, algorithm or process 900 for transforming raw accelerometer data into a form for use in determining a yaw angle, and determining a premium and a driving pattern. The method 900 may be performed by the processor of a client computing device 104 and/or a data server 128. The data server (such as data server 128 described in reference to FIG. 1) may receive the raw telematics data from the client computing device.

In some embodiments, the processor may use the output of the method 800, as the first step in a two-step process to calculate the yaw angle. Once the output of the method 800 has been produced, the processor may execute the method 900 to find the angular mode by determining all values of yaw around the output obtained by the method 800.

Figure 10C:
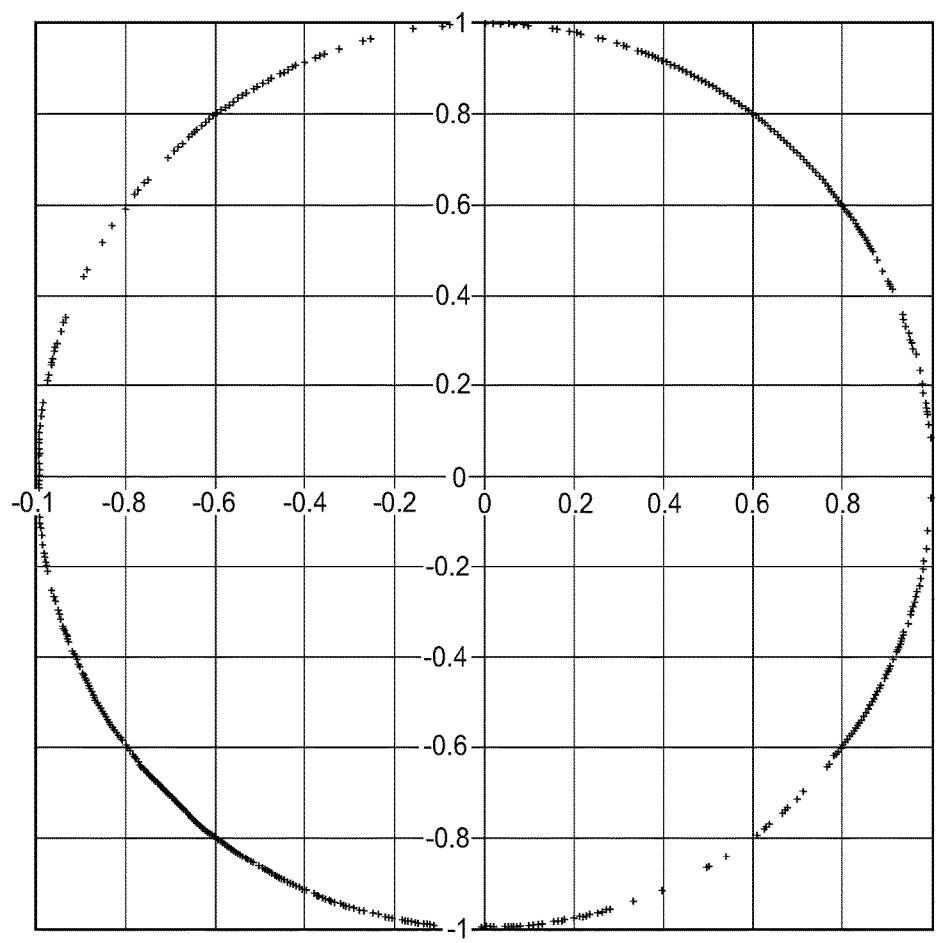
FIG. 10C is yet another graph depicting an example scatter plot of x and y data for a client computing device placed in a vehicle.

The processor may receive the output of the method 800 (block 902) and execute an instruction to normalize all acceleration vectors above a threshold value (block 904) to a unit vector. In some embodiments, the threshold value may be equal to 0.1 G. Graphically, the instruction executed by the processor makes the endpoints of all the vectors lie on the unit circle. Turning briefly to FIG. 10C, a graph depicts a scatter plot of x and y data after the processor has executed an instruction to normalize the remaining vectors magnitude to a value of 1 and the processor has executed an instruction to project the points on a unit circle. In some embodiments, the instruction may incorporate an expression for graphing the points to the unit circle.

Figure 10D:
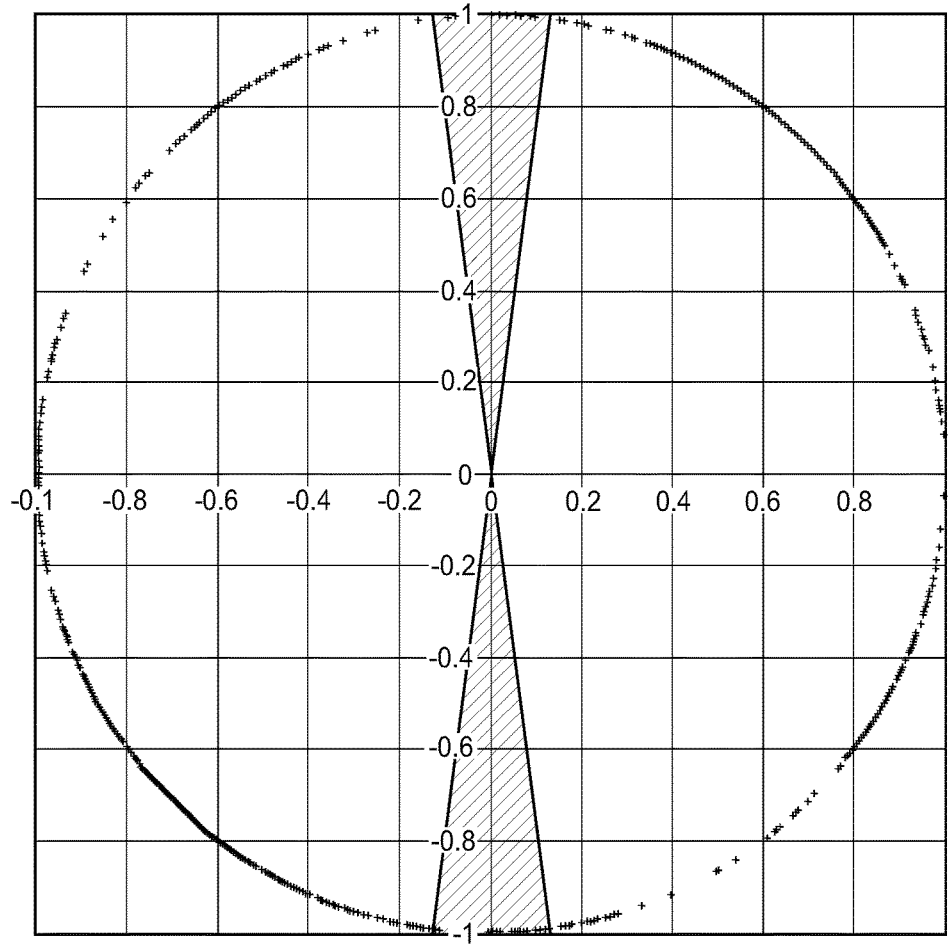
FIG. 10D is another graph depicting an example scatter plot of x and y data for a client computing device placed in a vehicle.

The processor may execute an instruction to overlay a static region (block 906) with, for example, an arc length of 10 degrees that is centered along the y-axis, which as discussed above, is where the assumed modal direction is located. FIG. 10D graphically depicts a static region with an arc length of 10 degrees centered along the y-axis.

Figure 10E:
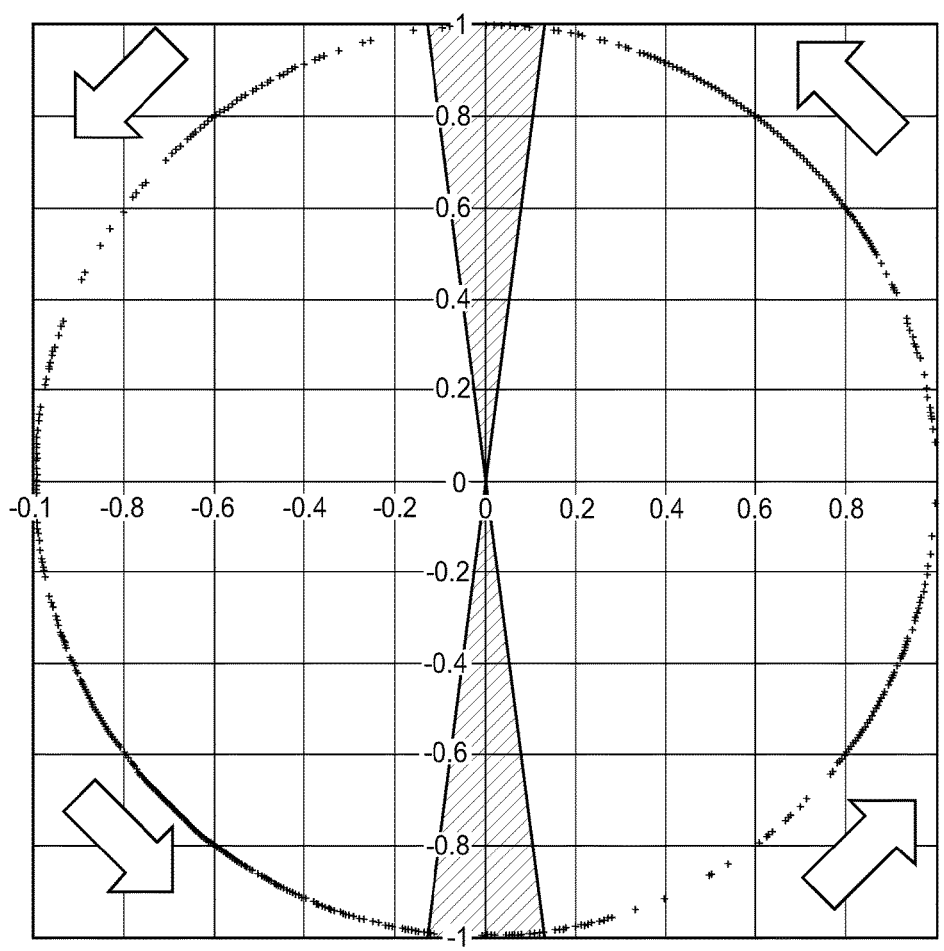
FIG. 10E is yet another graph depicting an example scatter plot of x and y data for a client computing device placed in a vehicle.
Figure 10F:
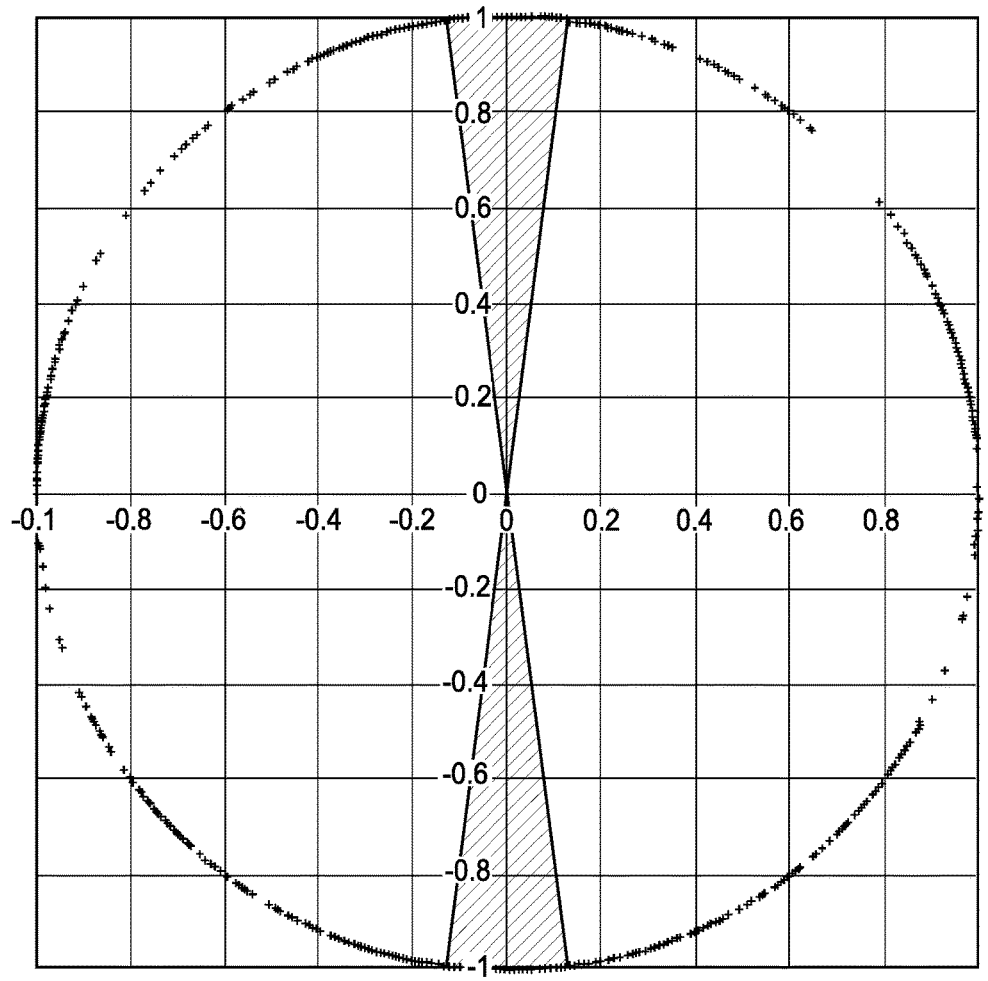
FIG. 10F is a graph depicting a rotation of the example scatter plot of FIG. 10E.

Next, the processor may then execute an instruction to rotate the scatter plot (block 908). In some embodiments, the scatter plot may be rotated at, for example, 1 degree at a time. The rotation is graphically depicted in FIGS. 10E and 10F. The processor may also execute an instruction to determine the number of points in the static region at each rotation (block 910). The processor may also execute an instruction to count the number of points that lie in the fixed region (denoted by $n_i$) and record the highest count, $n_{max}$, with corresponding angle $\psi_{max}$. In some embodiments, the number of points may be equal to the sum of the count in the bottom half and top half of the static region. In some embodiments, the processor may execute an instruction to perform the rotation one degree at a time, performing a total of 180 calculations.

The processor executing the instruction may also determine the angle with the number of points in the static region count (block 912). This may be represented as, for example, $\omega\_max$. FIG. 10D graphically depicts an arc of, for example 10 degrees, overlaid on the region with the greatest distribution of points. However, it is also possible that the processor executing the instruction will record one or more angles that are within a threshold amount from $\psi\_max$. The processor executing the instruction may record any angle of rotation that produces a count within a threshold value of $\psi\_max$. In some embodiments, the threshold may be five data points, though in other embodiments, other threshold values may be used.

The processor may execute an instruction to calculate a weighted average with all of the recorded angle of rotation that produced a count within the threshold value. The processor may then execute an instruction to calculate the yaw angle (w) (block 914). For example, the instruction may incorporate the formula:

$$\psi = a\tan 2(\Sigma_i n_i \sin \psi_i, \Sigma_i n_i \cos \psi_i) \text{ for all } i \text{ such that}$$
$$|n_{max} - n_i| \leq 5$$

In this manner the processor executing the instruction calculates a refined measure of yaw, but still has four possible solutions: $\psi$, $\psi+\pi/2$, $\omega+\pi$ and $$\psi, \psi + \frac{\pi}{2}, \psi + \pi \text{ and } \psi + \frac{3\pi}{2}.$$

These solutions provide two time series signal orthogonal to each other; one is forward/backward acceleration and the second is left/right turn events. The processor may further execute an instruction to correlate the yaw data with additional available sensor data (block 916). For example, the processor can execute an instruction to correlate the yaw data with GPS speed, gyroscope or magnetic sensor data when available to identify which yaw data corresponds to forward/backward motion.

If GPS is available sporadically or always, that can be used to determine a GPS speed-based longitudinal and lateral acceleration. Measuring correlation between the accelerometer-based forward/backward and left/right acceleration signal, one can identify the heading direction.

If the device contains sensors to measure azimuth, then rate of change of azimuth is equal to angular speed and lateral acceleration. Azimuth is defined as the angle between Earth's magnetic north pole and the device's positive y-axis. This is given by:

Lateral acceleration=speed×angular speed

The positive changes in angular speed indicate right turns and a negative change indicates left turns. Correlating the angular speed signal with the two pairs of solution will help identify all four directions. The angular speed signal will maximally and positively correlate left and right turns when right turns are aligned with positive azimuth changes. In some embodiments, gyroscope data can also be used to identify angular speed.

The processor may also execute an instruction to use at least the yaw angle to determine one or more driving patterns (block 918). The processor may also execute an instruction to use at least the driving patterns to determine one or more insurance premiums. In some embodiments, the insurance premiums may be associated with a user account, such as the user account associated with the client computing device. For example, the processor may execute an instruction to use the driving patterns to determine one or more driving characteristics of a driver associated with an insurance account. The processor may also execute an instruction to determine a risk level of the driver associated with the insurance account based on the driving characteristics and/or driving patterns. The processor may also execute an instruction to determine one or more insurance premiums based on the risk level.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the client computing device 104, the server 128, or any combination of computing devices within the system 100). The routines may be included as part of any of the modules described in relation to FIG. 1 or 2 or as part of a module that is external to the system illustrated by FIGS. 1 and 2. For example, the methods may be part of a browser application or an application running on the client computing device 104 as a plug-in or other module of the browser application. Further, the methods may be employed as "software-as-a-service" to provide the client computing device 104 with access to the data server 128.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of the system for identifying heading of a moving vehicle using accelerometer data for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for identifying heading of a moving vehicle using accelerometer data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for determining a driving pattern from raw telematics data originated from a client computing device in a vehicle, the method comprising:
    removing, by one or more processors, a gravitational data component from the telematics data in a first primary movement window of a vehicle trip leaving a vector defined by a longitudinal data component and a latitudinal data component in a longitudinal-latitudinal plane, wherein the first primary movement window is indicative of the client computing device being static with respect to movement of the vehicle, and wherein each of the longitudinal data component and the latitudinal data component has two acceleration effects;
    combining, by the one or more processors, the longitudinal data component and the latitudinal data component to create an angular average of four times the directions of all vectors in the longitudinal-latitudinal plane such that all four acceleration effects of the plurality of telematics data are in one direction;
    generating, by the one or more processors, one or more yaw angle estimates from the primary movement window of the vehicle trip using the angular average;
    determining, by the one or more processors, a driving pattern using at least one of the yaw angle estimates.

2. The method of claim 1 further comprising:
    determining, by the one or more processors, a driving pattern using at least one of: a constant speed time, an idling time, an acceleration event, a braking event, a turning event, GPS data, gyroscope data and magnetometer data.

3. The method of claim 1 further comprising:
    summarizing, by the one or more processors, the driving pattern from the first primary movement windows at one or more of: a trip, a day, a month or a year level.

4. The method of claim 1 further comprising:
    receiving, via a computer network, a plurality of GPS data corresponding to a trip of the vehicle, wherein the plurality of telematics data originates from the client computing device and includes a GPS speed data;
    analyzing, by the one or more processors, the plurality of GPS data;
    determining, by the one or more processors, that the plurality of GPS data is accurate; and
    combining, by the one or more processors, the plurality of GPS data with the plurality of telematics data.

5. The method of claim 1 further comprising:
    generating, by the one or more processors, a pitch and a roll angle from the first primary movement window of the vehicle trip;
    determining, by the one or more processors, a driving pattern using at least one of: the pitch and roll angles; and
    determining, by the one or more processors, that using at least the pitch and roll angles is indicative of at least one of: an acceleration data of an acceleration event, a braking event, a left turn event or a right turn event.

6. The method of claim 1 further comprising:
    analyzing, by the one or more processors, the one or more yaw angle estimates; and
    determining, by the one or more processors, a final yaw angle from the one or more yaw angle estimates that best aligns the acceleration data with the plurality of telematics data.

7. A computer device for determining a driving pattern from raw telematics data originated from a client computing device in a vehicle, the computer device comprising:
    one or more processors; and
    one or more memories coupled to the one or more processors;
    the one or more memories including non-transitory computer executable instructions stored therein that, when executed by the one or more processors, cause the one or more processors to:
        remove a gravitational data component from the telematics data in a first primary movement window of a vehicle trip leaving a vector defined by a longitudinal data component and a latitudinal data component in a longitudinal-latitudinal plane, wherein the first primary movement window is indicative of the client computing device being static with respect to movement of the vehicle, and wherein each of the longitudinal data component and the latitudinal data component has two acceleration effects;

combine the longitudinal data component and the latitudinal data component to create an angular average of four times the directions of all vectors in the longitudinal-latitudinal plane such that all four acceleration effects of the plurality of telematics data are in one direction;

generate, using the angular average, one or more yaw angle estimates from the first primary movement window of the vehicle trip; and determine a driving pattern based on at least one of the yaw angle estimates.

8. The computer device of claim 7, wherein the non-transitory computer executable instructions further cause the one or more processors to:

summarize the driving pattern from the first primary movement windows at one or more of: a trip, a day, a month and a year level and relating that with an insurance account to determine driving risk.

9. The computer device of claim 7, wherein the non-transitory computer executable instructions further cause the one or more processors to:

receive a plurality of GPS data corresponding to a trip of the vehicle, wherein the plurality of telematics data originates from the client computing device and includes a GPS speed data;

analyze the plurality of GPS data;

determine that the plurality of GPS data is accurate; and combine the plurality of GPS data with the plurality of telematics data.

10. The computer device of claim 7, wherein the non-transitory computer executable instructions further cause the one or more processors to:

analyze the one or more yaw angle estimates; and determine a final yaw angle from the one or more yaw angle estimates that best aligns the acceleration data with the plurality of telematics data.

11. The computer device of claim 7, wherein the non-transitory computer executable instructions further cause the one or more processors to:

generate a pitch and a roll angle from the first primary movement window of the vehicle trip;

determine a driving pattern using at least one of: the pitch and roll angles; and determine that using at least the pitch and roll angles is indicative of at least one of: an acceleration of an acceleration event, a braking event, a left turn event or a right turn event.

12. A non-transitory computer readable storage medium having instructions stored thereon for determining a driving pattern from raw telematics data originated from a client computing device in a vehicle, the instructions when executed on one or more processors cause the one or more processors to:

remove a gravitational data component from the telematics data in a first primary movement window of a vehicle trip leaving a vector defined by a longitudinal data component and a latitudinal data component in a longitudinal-latitudinal plane, wherein the first primary movement window is indicative of the client computing device being static with respect to movement of the vehicle, and wherein each of the longitudinal data component and the latitudinal data component has two acceleration effects;

combine the longitudinal data component and the latitudinal data component to create an angular average of four times the directions of all vectors in the longitudinal-latitudinal plane such that all four acceleration effects of the plurality of telematics data are in one direction;

generate, using the angular average, one or more yaw angle estimates from the first primary movement window of the vehicle trip using the created function without determining which data component corresponds with which acceleration effect; and determine a driving pattern based on at least one of the yaw angle estimates.

13. The non-transitory computer readable storage medium of claim 12, further comprising instructions stored thereon that cause the one or more processors to:

summarize the driving pattern from the first primary movement windows at one or more of: a trip, a day, a month and a year level.

14. The non-transitory computer readable storage medium of claim 12, further comprising instructions stored thereon that cause the one or more processors to:

receive a plurality of GPS data corresponding to a trip of the vehicle, wherein the plurality of telematics data originates from the client computing device and includes a GPS speed data;

analyze the plurality of GPS data;

determine that the plurality of GPS data is accurate; and combine the plurality of GPS data with the plurality of telematics data.

15. The non-transitory computer readable storage medium of claim 12, further comprising instructions stored thereon that cause the one or more processors to:

analyze the one or more yaw angle estimates; and determine a final yaw angle from the one or more yaw angle estimates that best aligns the acceleration data with the plurality of telematics data.

16. The non-transitory computer readable storage medium of claim 12, further comprising instructions stored thereon that cause the one or more processors to:

generate a pitch and a roll angle from the first primary movement window of the vehicle trip;

determine a driving pattern using at least one of: the pitch and roll angles; and determine that using at least the pitch and roll angles is indicative of at least one of: an acceleration of an acceleration event, a braking event, a left turn event or a right turn event.

17. The non-transitory computer readable storage medium of claim 12, further comprising instructions stored thereon that cause the one or more processors to:

determine a driving pattern using at least one of: a constant speed time, an idling time, an acceleration event, a braking event, a turning event GPS data, gyroscope data and magnetometer data.

* * * * *